US011164067B2

(12) United States Patent
Liang et al.

(10) Patent No.: US 11,164,067 B2
(45) Date of Patent: Nov. 2, 2021

(54) SYSTEMS, METHODS, AND APPARATUSES FOR IMPLEMENTING A MULTI-RESOLUTION NEURAL NETWORK FOR USE WITH IMAGING INTENSIVE APPLICATIONS INCLUDING MEDICAL IMAGING

(71) Applicant: Arizona Board of Regents on Behalf of Arizona State University, Scottsdale, AZ (US)

(72) Inventors: Jianming Liang, Scottsdale, AZ (US); Zongwei Zhou, Tempe, AZ (US); Md Mahfuzur Rahman Siddiquee, Tempe, AZ (US); Nima Tajbakhsh, Los Angeles, CA (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 0 days.

(21) Appl. No.: 16/556,130

(22) Filed: Aug. 29, 2019

(65) Prior Publication Data

US 2020/0074271 A1    Mar. 5, 2020

Related U.S. Application Data

(60) Provisional application No. 62/724,089, filed on Aug. 29, 2018.

(51) Int. Cl.
 *G06N 3/04* (2006.01)
 *G06T 7/11* (2017.01)
 (Continued)

(52) U.S. Cl.
 CPC ............ *G06N 3/04* (2013.01); *G06K 9/0014* (2013.01); *G06N 3/08* (2013.01); *G06T 7/11* (2017.01);
 (Continued)

(58) Field of Classification Search
 CPC ........... G06N 3/04; G06N 3/08; G06N 7/005; G06N 3/082; G06N 3/084; G06N 3/0454;
 (Continued)

(56) References Cited

U.S. PATENT DOCUMENTS 9,152,926 B2   10/2015   Liang et al.
9,330,336 B2    5/2016   Tajbakhsh et al.
(Continued)

FOREIGN PATENT DOCUMENTS

WO    2012109670 A1    8/2012
WO    2012109676 A1    8/2012
(Continued)

OTHER PUBLICATIONS

Tong et al., "Image Super-Resolution Using Dense Skip Connections," IEEE International Conference on Computer Vision (ICCV), 2017.*
(Continued)

*Primary Examiner* — Xuemei G Chen
(74) *Attorney, Agent, or Firm* — Elliott, Ostrander & Preston, P.C.

(57) ABSTRACT

Disclosed are provided systems, methods, and apparatuses for implementing a multi-resolution neural network for use with imaging intensive applications including medical imaging. For example, a system having means to execute a neural network model formed from a plurality of layer blocks including an encoder layer block which precedes a plurality of decoder layer blocks includes: means for associating a resolution value with each of the plurality of layer blocks; means for processing via the encoder layer block a respective layer block input including a down-sampled layer block output processing, via decoder layer blocks, a respective layer block input including an up-sampled layer block output and a layer block output of a previous layer block (Continued)

associated with a prior resolution value of a layer block which precedes the respective decoder layer block; and generating the respective layer block output by summing or concatenating the processed layer block inputs.

20 Claims, 18 Drawing Sheets

(51) Int. Cl.
  *G06N 3/08* (2006.01)
  *G06K 9/00* (2006.01)
(52) U.S. Cl.
  CPC .............. *G06T 2207/20016* (2013.01); *G06T 2207/20084* (2013.01)
(58) Field of Classification Search
  CPC ............. G06T 7/11; G06T 2207/20016; G06T 2207/20084; G06K 9/0014; G06K 9/627
  See application file for complete search history.

(56) References Cited

U.S. PATENT DOCUMENTS

| | | |
|---|---|---|
| 9,449,381 B2 | 9/2016 | Liang |
| 9,603,554 B2 | 3/2017 | Liang et al. |
| 9,684,957 B2 | 6/2017 | Wu et al. |
| 9,700,213 B2 | 7/2017 | Tajbakhsh et al. |
| 9,710,916 B2 | 7/2017 | Thiagarajan et al. |
| 9,741,116 B2 | 8/2017 | Liang et al. |
| 9,747,687 B2 | 8/2017 | Tajbakhsh et al. |
| 9,924,927 B2 | 3/2018 | Shin et al. |
| 9,959,615 B2 | 5/2018 | Liang et al. |
| 9,978,142 B2 | 5/2018 | Chi et al. |
| 10,045,728 B2 | 8/2018 | Wu et al. |
| 10,052,027 B2 | 8/2018 | Tajbakhsh et al. |
| 10,055,843 B2 | 8/2018 | Tajbakhsh et al. |
| 10,096,125 B1* | 10/2018 | Yang .......................... G06T 7/74 |
| 10,120,980 B2 | 11/2018 | Liang |
| 10,157,467 B2 | 12/2018 | Dincer et al. |
| 10,328,282 B2 | 6/2019 | An et al. |
| 10,521,927 B2* | 12/2019 | Teixeira .................... G06T 7/50 |
| 10,610,203 B2 | 4/2020 | Liang et al. |
| 10,643,360 B2 | 5/2020 | Frakes et al. |
| 10,803,591 B2* | 10/2020 | Wong .................... G06N 3/0454 |
| 10,810,469 B2* | 10/2020 | Sunkavalli ........... G06K 9/6267 |
| 10,812,825 B2* | 10/2020 | Liu ....................... H04N 19/587 |
| 10,861,151 B2 | 12/2020 | Liang et al. |
| 2017/0124701 A1 | 5/2017 | Liang et al. |
| 2018/0101957 A1* | 4/2018 | Talathi ....................... G06T 7/10 |
| 2018/0177461 A1* | 6/2018 | Bell ...................... A61B 8/5207 |
| 2018/0218497 A1* | 8/2018 | Golden ................. G06T 7/0012 |
| 2018/0259608 A1* | 9/2018 | Golden ...................... G06T 7/11 |
| 2018/0268220 A1* | 9/2018 | Lee ......................... G06K 9/627 |
| 2018/0314943 A1 | 11/2018 | Liang et al. |
| 2019/0005670 A1* | 1/2019 | DeTone .................. G06T 7/593 |
| 2019/0035113 A1* | 1/2019 | Salvi ......................... G06N 3/08 |
| 2019/0049540 A1* | 2/2019 | Odry .................. G01R 33/5608 |
| 2019/0064378 A1* | 2/2019 | Liu ....................... G06N 3/0454 |
| 2019/0108634 A1* | 4/2019 | Zaharchuk ................ G06T 7/50 |
| 2019/0139216 A1* | 5/2019 | Georgescu ................ G06T 7/11 |
| 2019/0142519 A1* | 5/2019 | Siemionow ............ A61B 34/10 600/408 |
| 2019/0147255 A1* | 5/2019 | Homayounfar ...... G06N 3/0454 701/23 |
| 2019/0155973 A1* | 5/2019 | Morczinek ........... G06K 9/6296 |
| 2019/0213779 A1* | 7/2019 | Sutton ..................... G06T 15/08 |
| 2019/0223725 A1* | 7/2019 | Lu ......................... G06N 3/084 |
| 2019/0261945 A1* | 8/2019 | Funka-Lea ............. A61B 8/145 |
| 2019/0295223 A1* | 9/2019 | Shen ..................... G06K 9/6256 |
| 2019/0311202 A1* | 10/2019 | Lee ....................... G06K 9/6256 |
| 2019/0332896 A1 | 10/2019 | Liang et al. |
| 2019/0340152 A1* | 11/2019 | Master ................. G06F 9/30181 |
| 2019/0340810 A1* | 11/2019 | Sunkavalli ............ G06T 15/506 |
| 2019/0369190 A1* | 12/2019 | Ye .......................... G06T 11/003 |
| 2020/0005511 A1* | 1/2020 | Kavidayal ............... G06N 3/088 |
| 2020/0020098 A1* | 1/2020 | Odry ..................... G06K 9/6245 |
| 2020/0041597 A1* | 2/2020 | Daval Frerot ........ G06N 3/0454 |
| 2020/0041612 A1* | 2/2020 | Harrison ................. G01S 7/417 |
| 2020/0065969 A1* | 2/2020 | Huang ................. G06N 3/0454 |
| 2020/0074701 A1 | 3/2020 | Liang et al. |
| 2020/0085382 A1* | 3/2020 | Taerum ................. G06T 7/0016 |
| 2020/0160065 A1* | 5/2020 | Weinzaepfel ....... G06K 9/00664 |
| 2020/0250794 A1* | 8/2020 | Zimmer ................ G06T 3/4076 |
| 2020/0286263 A1* | 9/2020 | Li .......................... G06T 11/001 |
| 2020/0311914 A1* | 10/2020 | Zaharchuk ............. A61B 6/501 |
| 2020/0320748 A1* | 10/2020 | Levinshtein ........ G06K 9/00248 |
| 2020/0364477 A1 | 11/2020 | Siddiquee et al. |
| 2020/0380675 A1* | 12/2020 | Golden ................... G06T 7/143 |
| 2020/0380695 A1 | 12/2020 | Zhou et al. |

FOREIGN PATENT DOCUMENTS

| | | |
|---|---|---|
| WO | 2013116865 A1 | 8/2013 |
| WO | 2013116867 A1 | 8/2013 |
| WO | 2015031641 A1 | 3/2015 |
| WO | 2015113014 A1 | 7/2015 |
| WO | 2015142808 A1 | 9/2015 |
| WO | 2015164724 A1 | 10/2015 |
| WO | 2015164768 A1 | 10/2015 |
| WO | 2016161115 A1 | 10/2016 |
| WO | 2017027475 A1 | 2/2017 |
| WO | 2021016087 A1 | 1/2021 |

OTHER PUBLICATIONS

U.S. Appl. No. 17/098,422, filed Nov. 15, 2020, Hosseinzadeh Taher et al.

Zhou, Z., et al., "Fine-tuning convolutional neural networks for biomedical image anaysis: actively incrementally," IEEE conference on computer vision and pattern recognition (CVPR) (2017), pp. 7340-7351.

Al-hinnawi, A.R.M., et al., "Collaboration between interactive three-dimensional visualization and computer aided detection of pulmonary embolism on computed tomography pulmonary angiography views" (2018), Radiological Physics and Technology 11, pp. 61-72.

Armato, S.G., et al., "The lung image database consortium (lidc) and image database resource initiative (idri): a completed reference database of lung nodules on ct scans," Medical physics, (2011) pp. 915-931.

Badrinarayanan, V., et al., "Segnet, A deep convolutional encoder-decoder architecture for image segmentation," IEEE transactions on pattern analysis and machine intelligence (2017), pp. 39(12):2481-2495.

Bouma, H., et al., "Automatic detection of pulmonary embolism in cta images" (2009), Medical Imaging, IEEE Transactions on 28, pp. 1223-1230.

Buhmann, S., et al., "Clinical evaluation of a computer-aided diagnosis (cad) prototype for the detection of pulmonary embolism" (2007), Academic radiology 14, pp. 651-658.

Calder, K.K., et al., "The mortality of untreated pulmonary embolism in emergency department patients" (2005), Annals of emergency medicine 45, pp. 302-310.

Cardona, A., et al., "An integrated micro- and macroarchitectural analysis of the drosophila brain by computer-assisted serial section electron microscopy," PLoS biology (2010), 17 pages.

Chen, L.-C., et al., "Encoder-decoder with atrous separable convolution for semantic image segmentation," (2018), 18 pages.

Ciresan, D., et al., "Multi-column deep neural networks for image classification" (2012), Computer Vision and Pattern Recognition (CVPR), 2012 IEEE Conference on, IEEE. pp. 3642-3649.

Ding, J., et al., "Accurate pulmonary nodule detection in computed tomography images using deep convolutional neural networks" (2017), International Conference on Medical Image Computing and Computer-Assisted Intervention, Springer, pp. 559-567.

Dou, Q., et al., "3d deeply supervised net-work for automatic liver segmentation from ct volumes" (2016), International Conference on Medical Image Computing and Computer-Assisted Intervention, Springer, pp. 149-157.

(56) References Cited

OTHER PUBLICATIONS

Drozdzal, M., et al., "The importance of skip connections in biomedical image segmentation," Deep Learning and Data Labeling for Medical Applications (2016), pp. 179-187.

Engelke, C., et al., "Computer assisted detection of pulmonary embolism: performance evaluation in consensus with experienced and inexperienced chest radiologists" (2008), European radiology 18, pp. 298-307.

Fairfield, J., "Toboggan contrast enhancement for collrast segmentation," Pattern Recognition, 1990. Proceedings., 10th International Conference, IEEE. pp. 712-716.

Fourure, D., et al., "Residual conv-deconv grid network for semantic segmentation," arXiv preprint arXiv: 1707.07958, (2017), 12 pages.

Glorot, X., et al., "Understanding the difficulty of training deep feedforward neural networks" (2010), International conference on artificial intelligence and statistics, pp. 249-256.

Greenspan, H., et al., "Guest editorial deep learning in medical imaging: Overview and future promise of an exciting new technique," IEEE Transactions on Medical Imaging (2016), pp. 1153-1159.

He, K., et al., "Deep residual learning for image recognition," Proceedings of the IEEE conference on computer vision and pattern recognition (2016), pp. 770-778.

He, K., et al.,"Mask r-cnn," Computer Vision (ICCV), 2017 IEEE International Conference, (2017), pp. 2980-2988.

Huang, G., et al., "Densely connected convolutional networks," Proceedings of the IEEE conference on computer vision and pattern recognition (2017), vol. 1, p. 3.

Jegou, S., et al., "The one hundred layers tiramisu: Fully convulutional densenets for semantic segmentation," Computer Vision and Pattern Recognition Workshops (CVPRW) (2017), pp. 1175-1183.

Krizhevsky, A., et al., "Imagenet classification with deep convolutional neural networks" (2012), Advances in neural information processing systems, pp. 1097-1105.

LeCun, Y., et al., "Backpropagation applied to handwritten zip code recognition" (1989), Neural computation 1, pp. 541-551.

Lee, C.-Y., et al., "Deeply-supervised nets," Artificial Intelligence and Statistics (2015), pp. 562-570.

Li, X., et al., "H-denseunet: Hybrid densely connected unet for liver and liver tumor segmentation from ct volumes," arXiv preprint arXiv:1709.07330 (2017), 10 pages.

Liang, J., et al., "Computer aided detection of pulmonary embolism with tobogganing and multiple instance classification in CT pulmonary angiography" (2007), Information Processing in Medical Imaging, Springer, pp. 630-541.

Long, J., "Fully convolutional networks for semantic segmentation," Proceedings of the IEEE conference on computer vision and pattern recognition (2015), pp. 3431-3440.

Maizlin, Z.V., et al., "Computer aided detection of pulmonary embolism on ct angiography: initial experience" (2007), Journal of thoracic imaging 22, pp. 324-329.

Masoudi, M., et al., "A new dataset of computed-tomography angiography images for computer-aided detection of pulmonary embolism" (2018), Scientific data.

Milletari, F., et al., "V-net: Fully convolutional neural networks for volumetric medical image segmentation," in: 3D Vision (3DV), 2016 Fourth International Conference on, IEEE (2016), pp. 565-571.

NesenNet ("NestNet"), https://openreview.net/forum?id=ryPLSWnsM, Apr. 11, 2018, entire document.

NesenNet ("NestNet"), https://openreview.net/pdf?id=ryPLSWnsM, Apr. 11, 2018, entire document.

Ozkan, H., et al., "A novel method for pulmonary embolism detection in cta images" (2014), Computer methods and programs in biomedicine 113, pp. 757-766.

Park, S.C., et al., "A multistage approach to improve performance of computer-aided detection of pulmonary embolisms depicted on CT images: Preliminary investigation" (2011), Biomedical Engineering, IEEE Transactions on 58, pp. 1519-1527.

Prasoon, A., et al., "Deep feature learning for knee cartilage segmentation using a triplanar convolutional neural network," Medical Image Computing and Computer-Assisted Intervention-MICCAI 2013, Springer, pp. 246-253.

Quan, T.M., et al., "Fusionnet: A deep fully residual convolutional neural network for image segmentation in connectomics" (2016), arXiv preprint arXiv:1612.05360, 10 pages.

Ronneberger, O., et al., "U-net: Convolutional networks for biomedical image segmentation," International Conference on Medical image computing and computer-assisted intervention (2015), pp. 234-241.

Roth, H., et al., "A new 2.5d representation for lymph node detection using random sets of deep convolutional neural network observations," in Golland, P., Hata, N., Barillot, C., Homegger, J., Howe, R. (Eds.), Medical Image Computing and Computer-Assisted Intervention MICCAI 2014, Springer International Publishing, vol. 8673 of Lecture Notes in Computer Science, pp. 520-527.

Roth, H., et al., "Detection of sclerotic spine metastases via random aggregation of deep convolutional neural network classifications," in: Yao, J., Glocker, B., Klinder, T., Li, S. (Eds.), Recent Advances in Computational Methods and Clinical Applications for Spine Imaging (2015), Springer International Publishing, vol. 20 of Lecture Notes in Computational Vision and Biomechanics, pp. 3-12.

Roth, H.R., et al., "Deep convolutional networks for pancreas segmentation in ct imaging" (2015), SPIE Medical Imaging, International Society for Optics and Photonics, pp. 94131G-94131G.

Roth, H.R., et al., "Improving computer-aided detection using convolutional neural networks and random view aggregation," (2016) To appear in IEEE Transaction in Medical Imaging, 12 pages.

Sadigh, G., et al., "Challenges, controversies, and hot topics in pulmonary embolism imaging" (2011), American Journal of Roentgenology 196,19 pages.

Setio, A.A.A., et al., "Pulmonary nodule detection in ct images: false positive reduction using multiview convolutional networks" (2016), IEEE transactions on medical imaging 35, pp. 1160-1169.

Simonyan, K., et al., "Very deep convolutional networks for large-scale image recognition," (2014), 13 pages.

Szegedy, C., "Going deeper with convolutions," Cvpr (2015), 9 pages.

Tajbakhsh, N., "Convulutional neural networks for medical image analysis: Full training or fine tuning?" IEEE transactions on medical imaging (2016), pp. 1299-1312.

Tajbakhsh, N., et al., "A comprehensive computeraided polyp detection system for colonoscopy videos" (2015), Information Processing in Medical Imaging, Springer. pp. 327-338.

Tajbakhsh, N., et al., "Automated polyp detection in colonoscopy videos using shape and context information" (2015), Medical Imaging, IEEE Transactions on pp. 1-1.

Tajbakhsh, N., et al., "Computer-aided pulmonary embolism detection using a novel vessel-aligned multi-planar image representation and convolutional neural networks" (2015), International Conference on Medical Image Computing and Computer-Assisted Intervention, Springer, pp. 62-69.

Tajbakhsh, N., et al., "Surrogate supervision for medical image analysis: Effective deep learning from limited quantities of labeled data" (2019), arXiv preprint arXiv:1901.08707.

* cited by examiner

Down-Sampling

Up-Sampling

Skip connection pathway 105

$X^{i,j}$ Convolution 103

FIG. 4B (a) 1-depth U-Net
(b) 2-depth U-Net
(c) 3-depth U-Net
(d) 4-depth U-Net (e) UNet^e
(f) UNet+

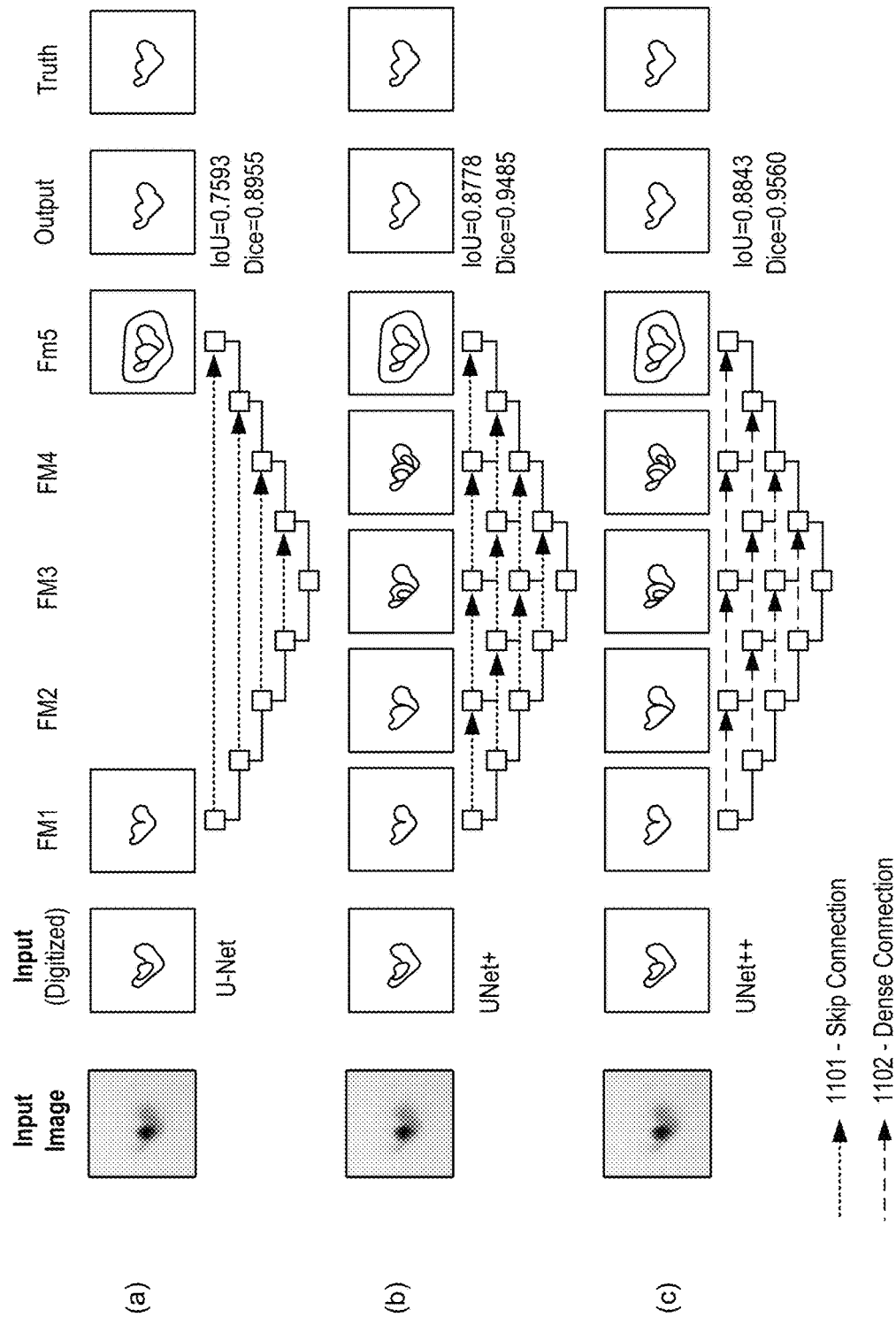

SYSTEMS, METHODS, AND APPARATUSES FOR IMPLEMENTING A MULTI-RESOLUTION NEURAL NETWORK FOR USE WITH IMAGING INTENSIVE APPLICATIONS INCLUDING MEDICAL IMAGING

CLAIM OF PRIORITY

This non-provisional U.S. Utility Patent Application is related to, and claims priority to the U.S. Provisional Patent Application No. 62/724,089, entitled "MULTI-RESOLUTION NEURAL NETWORKS," filed Aug. 29, 2018, the entire contents of which are incorporated herein by reference.

GOVERNMENT RIGHTS AND GOVERNMENT AGENCY SUPPORT NOTICE

None.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of imaging segmentation, and more particularly, to systems, methods, and apparatuses for implementing a multi-resolution neural network for use with imaging intensive applications including medical imaging.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Machine learning models operate to receive input and responsively generate output or predicted outputs, based on the received input. Some machine learning models are parametric models which generate output based on the received input and on values of the parameters of the machine learning model. Other machine learning models utilize so called "deep learning" or "deep machine learning models" which utilize multiple layers to progressively extract higher level features from received input to generate an output. For example, a deep neural network is a deep machine learning model that includes an output layer and one or more hidden or intermediate layers that each apply a non-linear transformation to a received input to generate an output.

Machine learning models have various applications to automatically process inputs and produce outputs considering situational factors and learned information to improve output quality. One area where machine learning models, and neural networks in particular, provide high utility is in the field of imaging segmentation, including for use with segmenting medical images. Models used for medical image segmentation commonly include encoder-decoder networks such as U-Net and fully convolution networks (FCNs), each of which use skip connection pathways that have information gaps in gradient flow.

Problematically, segmenting medical images to visualize them as a basis for diagnosing abnormalities requires a higher level of accuracy than is possible with raw input images. Any misdiagnosis or failure to recognize abnormalities may result in potentially devastating impacts on patient morbidity and mortality. Specifically, segmenting lesions and other abnormalities in medical images requires a high level of accuracy so as to ensure effective diagnosis and to avoid missing pathological hallmarks such as speculation patterns on nodules indicative of malignancy and further to avoid rendering a diagnosis based on inaccurate medical images such as an inaccurate display of the number of lymph nodes in an image which results in erroneous scoring of diagnostic criteria.

Embodiments of the invention therefore improve upon conventionally known image segmentation techniques and thus improve diagnostic accuracy in the medical field through the re-designing of network skip connections to allow for progressive feature adaptation. These improvements in turn improve patient health and save lives, as well as improving image recognition in a wide array of technical fields. Stated differently, the methodologies described herein provide solutions to improving systems for dealing with image representations of objects that are subject to unknown, ever-changing, and varying parameters, conditions, and characteristics, such as pathology in the human body.

The present state of the art may therefore benefit from systems, methods, and apparatuses for implementing a multi-resolution neural network for use with imaging intensive applications including medical imaging as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 4B depicts exemplary topologies of U-Net like, UNet+, and UNet++, in accordance with described embodiments;

FIG. 11A depicts examples of cell segmentation intermediate feature-maps and predictions of U-Net, UNet+ and UNet++ architectures without deep supervision, in accordance with described embodiments;

DETAILED DESCRIPTION

Figure 1A:
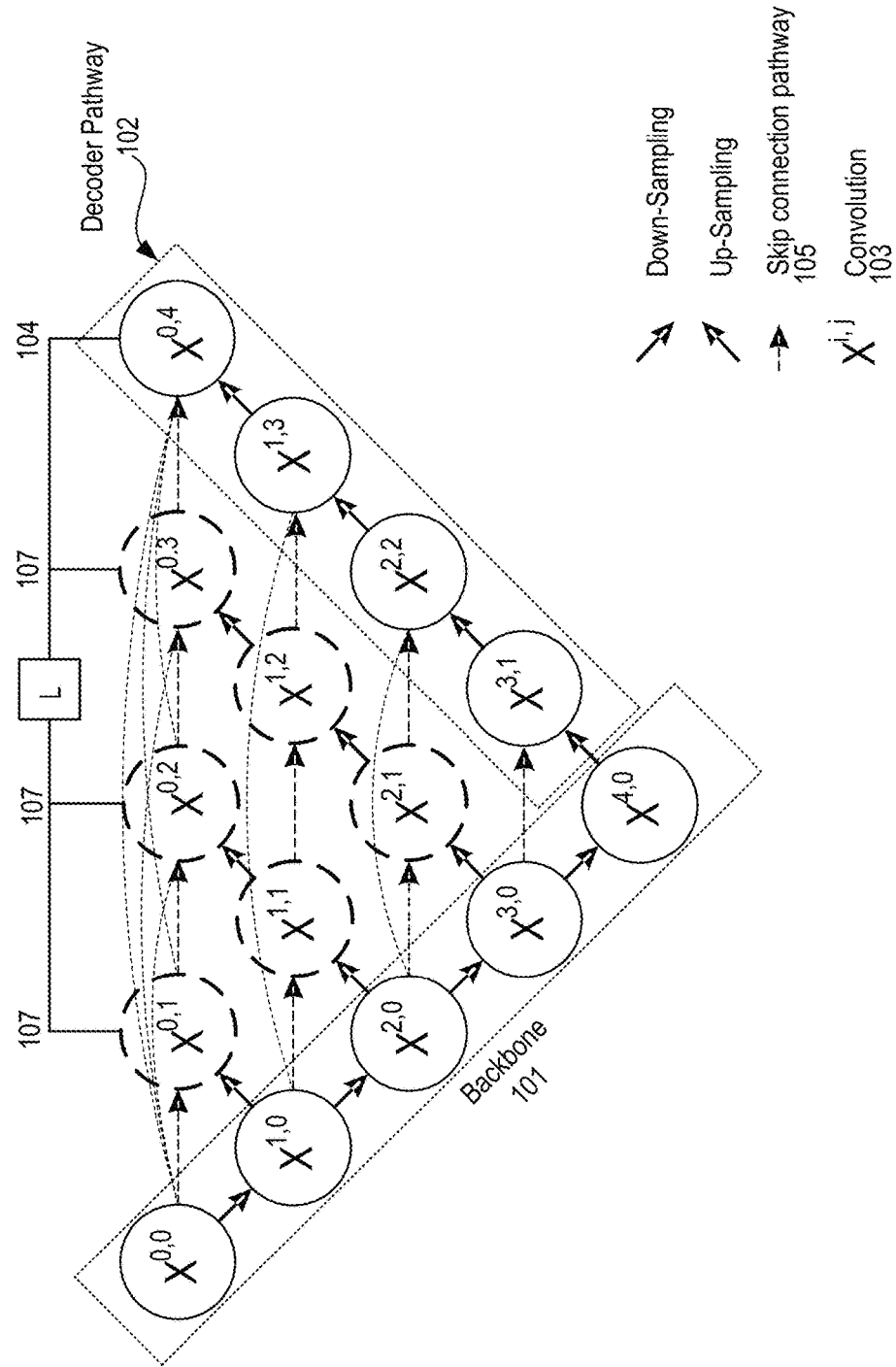
FIG. 1A depicts an exemplary overview of UNet++ architecture 100 in accordance with described embodiments.

Described herein are systems, methods, and apparatuses for implementing a multi-resolution neural network for use with imaging intensive applications including medical imaging. For example, there are described in accordance with certain embodiments, a system having at least a processor and memory therein and being specifically configured to carry out operations including: executing, via the processor, a neural network model stored within the memory of the system; in which the neural network model is formed from a plurality of layer blocks including an encoder layer block which precedes a plurality of decoder layer blocks; associating a resolution value with each of the plurality of layer blocks defining a resolution of the layer block input to be processed by the layer block to generate the layer block output; processing, via the encoder layer block, a respective layer block input including a down-sampled layer block output from a higher resolution layer block associated with a resolution value greater than the resolution value for the encoder layer block; processing, via each of the plurality of decoder layer blocks, a respective layer block input including both (i) an up-sampled layer block output from a lower resolution layer block associated with a resolution value less than the resolution value for the respective decoder layer block and (ii) a layer block output of a previous layer block associated with a prior resolution value of a layer block which precedes the respective decoder layer block; and generating the respective layer block output from the processing via the encoder layer block and the plurality of decoder layer blocks by summing or concatenating the processed layer block inputs.

According to described embodiments, there are provided system and methodologies for implementing an improved a neural network which includes multiple layer blocks. Each layer block includes one or more neural network layers and each layer block is configured to process a respective layer block input to generate a respective layer block output. Each layer block is associated with a resolution value defining a resolution of the respective layer block input processed by the layer block to generate the respective layer block output.

For a particular resolution value, the layer blocks in the neural network associated with the respective resolution value have an ordering and include an encoder layer block and multiple decoder layer blocks. The encoder layer block precedes the decoder layer blocks in the ordering. The encoder layer block is configured to process a respective layer block input including a down-sampled layer block output of a higher resolution layer block associated with a resolution value that is greater than the particular resolution value. Each decoder layer block is configured to process a respective layer block input including: (i) an up-sampled layer block output of a lower resolution layer block associated with a resolution value that is less than the particular resolution value, and (ii) a layer block output of a previous layer block associated with the particular resolution value that is prior to the decoder layer block in the ordering. According to described embodiments, processing inputs to any layer block includes summing the inputs or linking (e.g., "concatenating") the inputs.

According to such embodiments, each of the decoder layer blocks associated with the highest resolution value generates a layer block output defining a decoder output of the neural network. The neural network then generates a final output based on the decoder outputs generated by these decoder layer blocks associated with the highest resolution value, which may include averaging their outputs according to such embodiments or alternatively selecting a particular decoder output, based on the particular implementation preferences.

Practice of the disclosed embodiments yield several distinct advantages over conventional methodologies. For example, the neural networks described herein may include, for example, multiple different resolution values at each encoder layer block followed by multiple decoder layer blocks which may be densely connected via "skip connections," whereas prior solutions utilize only a single encoder layer block of a particular resolution followed by a single decoder layer block. By including multiple decoder layer blocks at different resolutions, the neural network implementations set forth herein operate to smooth multiple resolution feature propagation and encourage feature-map reuse, thus attaining higher prediction accuracy (e.g., improved segmentation prediction accuracy) in comparison with prior known techniques.

Further still, the improved neural networks described herein consume fewer computational resources (e.g., memory and computing power) in comparison with conventional neural networks as they may be trained to achieve acceptable levels of performance using less training data and fewer iterations of machine learning training procedures than is possible with prior methodologies. The improved neural network architecture described herein facilitates such reductions in computational resource consumption, for example, via the utilization of multiple decoder layer blocks at each resolution which thus improves numerical stability during training of the neural network.

Further still, the neural network described herein may be trained using "deep supervision," which results in the neural network being trained to generate outputs from multiple intermediate layers, each of which are trained to approximate the target output of the neural network. Training the neural network using deep supervision may therefore contribute to further reductions in computational resource consumption by the neural network during training compared to prior known techniques.

Certain embodiments disclosed herein therefore utilize deep supervision techniques and a multi-scale approach using segmentation branches with more than one loss layer to allow for model pruning. Deep supervision has been observed to be especially useful with segmenting components of organs and tissues that appear at varying scales in medical imaging such as cell nuclei and colon polyps.

Learning models have traditionally used plain skip connections that directly fast-forward high-resolution feature-maps from the encoder to the decoder network, resulting in the fusion of semantically dissimilar feature-maps, with recovery of some fine-grained details of target objects. Prior solutions simply do not modify skip connections through dense connections to create similar feature-maps for neural networks to improve the precision and other features of image segmentation.

The methodologies described herein further utilize neural network architectures capable of segmenting images based on nested and dense skip connections to more efficiently capture fine-grain details of foreground objects when high-resolution feature-maps from the encoder network are gradually enriched prior to fusion with corresponding semantically rich feature-maps from the decoder network. Described embodiments therefore improve the quality of image segmentation by optimizing an objective function ("loss term") corresponding to each decoder output of the neural network which in turn better satisfies the stricter segmentation requirements for medical images. Further benefits realized through practice of the disclosed embodiments include accommodating for smooth multiple resolution feature propagation, re-use of feature-maps, less data augmentation and thus less computational resource consumption, and accelerated convergence speed.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a specialized and special-purpose processor having been programmed with the instructions to perform the operations described herein. Alternatively, the operations may be performed by a combination of hardware and software. In such a way, the embodiments of the invention provide a technical solution to a technical problem.

Embodiments also relate to an apparatus for performing the operations disclosed herein. This apparatus may be specially constructed for the required purposes, or it may be a special purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various customizable and special purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

In addition to various hardware components depicted in the figures and described herein, embodiments further include various operations which are described below. The operations described in accordance with such embodiments may be performed by hardware components or may be embodied in machine-executable instructions, which may be used to cause a special-purpose processor programmed with the instructions to perform the operations. Alternatively, the operations may be performed by a combination of hardware and software, including software instructions that perform the operations described herein via memory and one or more processors of a computing platform.

FIG. 1A depicts an exemplary overview of UNet++ architecture 100 in accordance with described embodiments.

As shown here, the UNet++ 100 architecture starts with an encoder sub-network or backbone 101 followed by a decoder sub-network 102 connected by a series of nested dense convolution blocks. Contrast this with a U-Net architecture which comprises encoder backbone 101, decoder sub-network 102 (e.g., decoder pathway 102) and linkage 104. The UNet++ is distinguished from U-Net by the nested dense convolution blocks 108 and re-designed skip connections, and skip connection pathways 105, which connect the two sub-networks to create the skip pathways for use with deep supervision 107. Utilization of UNet++ in such a way bridges the semantic gap between the feature-maps of the encoder backbone 101 and decoder sub-network 102 prior to fusion. For example, the semantic gap between ($X^{0,0}$, $X^{1,3}$) is bridged using a dense convolution block with three convolution layers.

Re-designed Skip Pathways: The re-designed skip pathways depicted here transform the connectivity of the encoder (e.g., backbone 101) and de-coder (e.g., decoder pathway 102) sub-networks. With U-Net, feature-maps of the encoder are directly received in the decoder. However, with use of UNet++, the feature-maps undergo a dense convolution block whose number of convolution layers depends on the pyramid level. For example, the skip pathway between nodes $X^{0,0}$ and $X^{1,3}$ consists of a dense convolution block with three convolution layers where each convolution layer is preceded by a concatenation layer that fuses the output from the previous convolution layer of the same dense block with the corresponding up-sampled output of the lower dense block. Consequently, the dense convolution blocks 108 bring the semantic level of the encoder feature-maps closer to that of the feature-maps awaiting in the decoder pathway 102. Complementary optimizers therefore face a simplified and therefore easier optimization problem when the received encoder feature-maps and the corresponding decoder feature-maps are semantically similar.

Formally, the skip pathways are formulated as follows: let $x^{i,j}$ denote the output of node $X^{i,j}$ where i indexes the down-sampling layer along the encoder and j indexes the convolution layer of the dense block along the skip pathway. The stack of feature-maps represented by $x^{i,j}$ is computed in equation 1 below as follows:

$$x^{i,j} = \begin{cases} \mathcal{H}(x^{i-1,j}), & j = 0 \\ \mathcal{H}([[x^{i,k}]_{k=0}^{j-1}, u(x^{i+1,j-1})]), & j > 0 \end{cases}$$

where function $\mathcal{H}(\cdot)$ is a convolution operation followed by an activation function, $\mathcal{U}(\cdot)$ denotes an up-sampling layer, and [ ] denotes the concatenation layer. Nodes at level j=0 therefore receive only one input from the previous layer of the encoder, while nodes at level j=1 receive two inputs from the encoder sub-network, but at two consecutive levels, and further in which nodes at level j>1 receive j+1 inputs, of which j inputs are the outputs of the previous j nodes in the same skip pathway with the last input being the up-sampled output from the lower skip pathway. All prior feature-maps accumulate and arrive at the current node due to the use of a dense convolution block along each skip pathway.

Figure 1B:
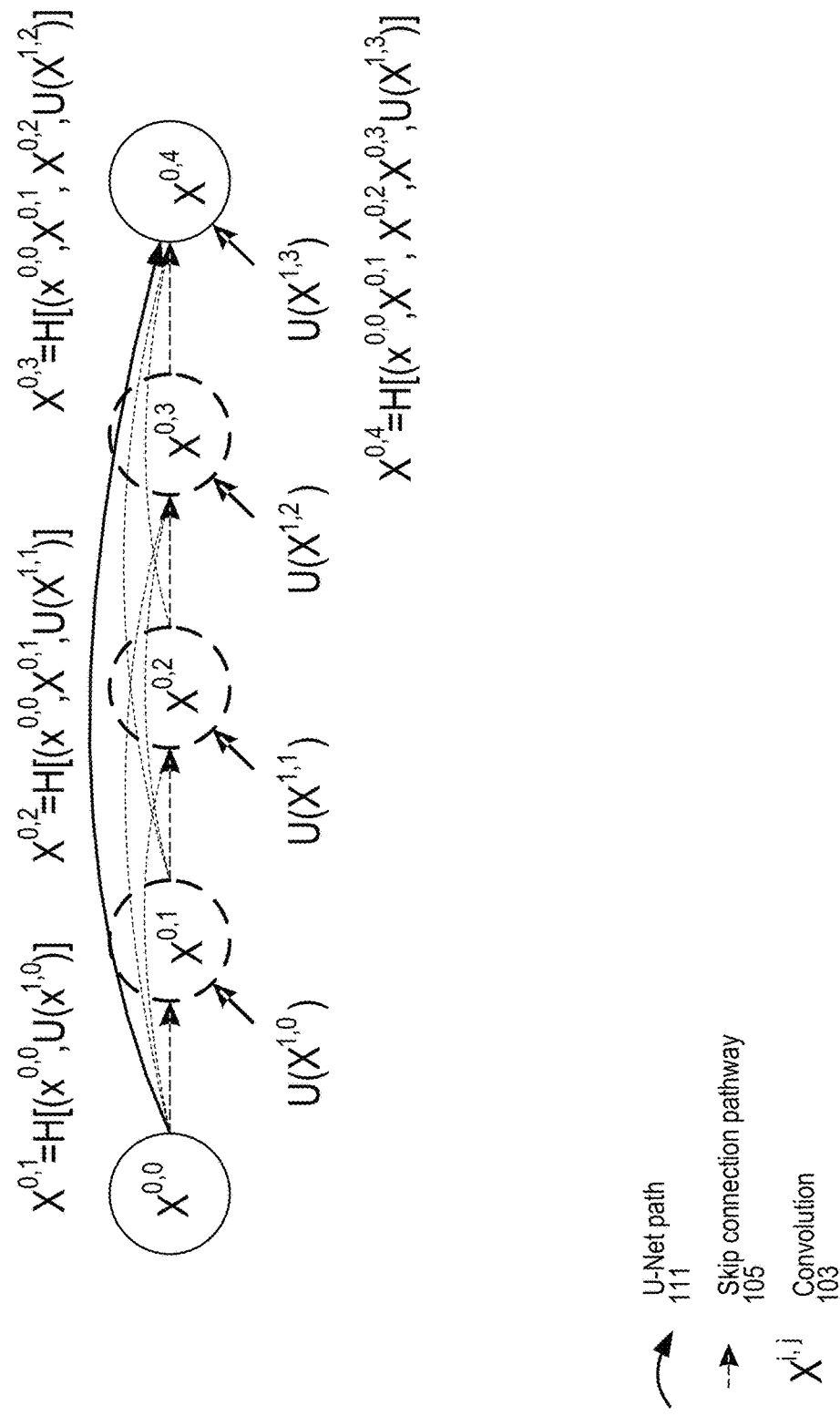
FIG. 1B depicts an exemplary detailed analysis of the first skip connection pathway (top connection pathway) of UNet++ 110 in accordance with described embodiments.

FIG. 1B depicts an exemplary detailed analysis of the first skip connection pathway (top connection pathway) of UNet++ 110 in accordance with described embodiments.

Depicted in greater detail here is the manner in which the feature-maps travel through the top skip pathway of UNet++ 110, thus further clarifying equation 1 set forth above. Notably, the feature-maps travel through the top skip pathway from the encoder backbone 101 to the decoder sub-network 102 via convolution blocks connected by the first skip connection pathway 105. The path used in U-Net architecture is also shown, depicted via the solid arrow representing U-Net path 111.

Deep Supervision: Through use of deep supervision in UNet++, described methodologies enable the model to operate in two modes, including: (1) an accurate mode in which the outputs from all segmentation branches are averaged; and (2) a fast mode in which the final segmentation map is selected from only one of the segmentation branches, the choice of which determines the extent of model pruning and speed gain.

Figure 1C:
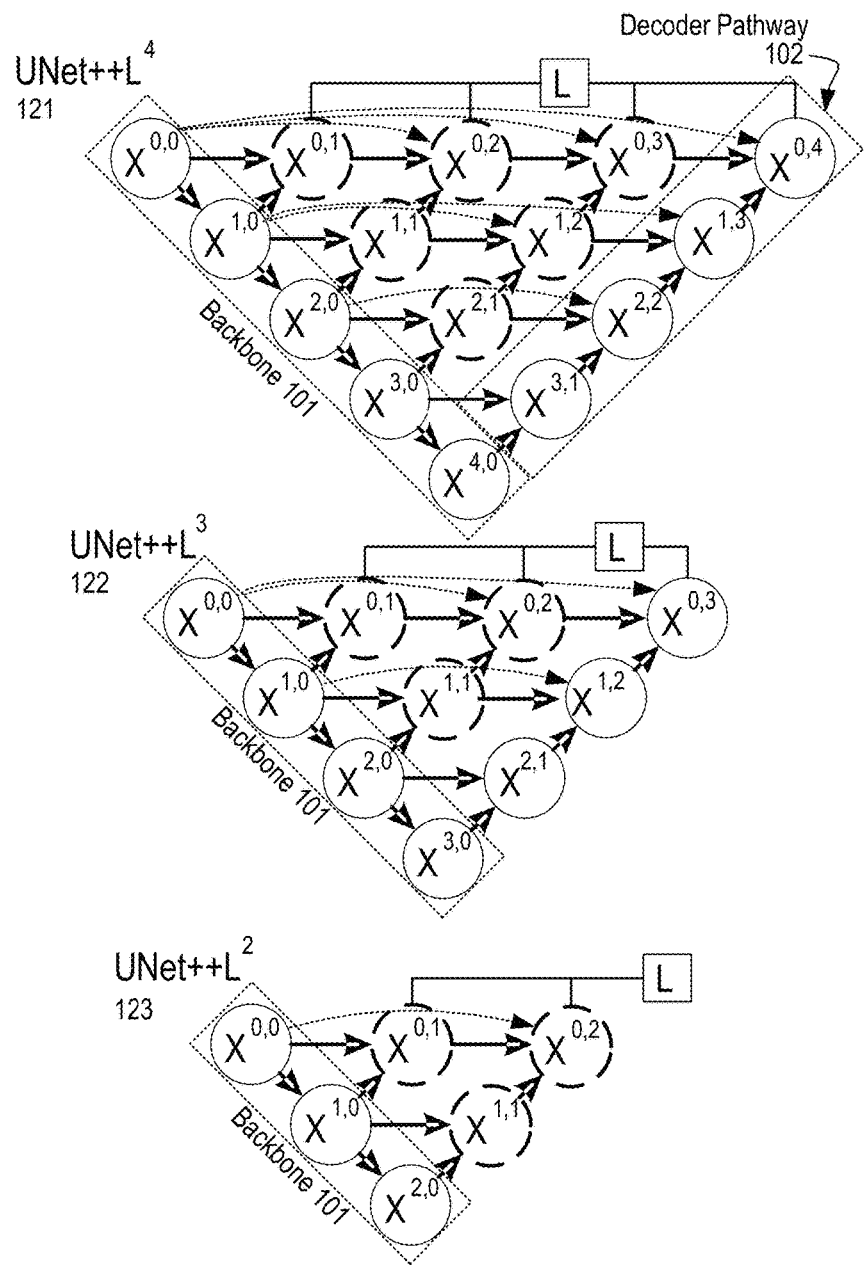
FIG. 1C depicts an exemplary overview of UNet++ pruning with deep supervision in accordance with described embodiments.
Figure 1C:
Figure 1C:
Figure 1C:
Figure 1C:
Figure 1C:
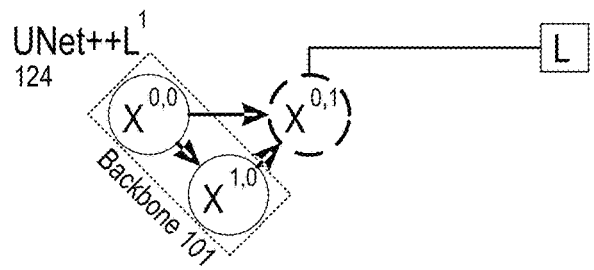

FIG. 1C depicts an exemplary overview of UNet++ pruning with deep supervision in accordance with described embodiments.

Depicted here is the manner by which the choice of segmentation branch when using the (2) fast mode results in architectures of varying complexity 120. Segmentation branch UNet++$L^1$ 124 involving nodes to $X^{0,0}$ to $X^{1,0}$ on encoder backbone 101 has the simplest architecture with only one convolution block 108, and thus the exhibits the greatest degree of model pruning consequently the greatest speed gain. In contrast, segmentation branch UNet++$L^4$ 121 involving nodes to $X^{0,0}$ to $X^{4,0}$ on encoder backbone 101 depicts the most complex architecture with six convolution blocks 108, and thus the least model pruning and least speed gain. Similarly, each of segmentation branch UNet++$L^2$ 123 involving nodes $X^{0,0}$ to $X^{2,0}$ on encoder backbone 101 and segmentation branch UNet++$L^3$ 122 involving nodes $X^{0,0}$ to $X^{3,0}$ to on encoder backbone 101, depict intermediate complexity in the architecture, and thus present an intermediate or balanced degrees of model pruning and speed gains.

Owing to the nested skip pathways, UNet++ generates full resolution feature-maps at multiple semantic levels, {$x^{0,j}$, j∈{1,2,3,4}}, which are amenable to deep supervision. A combination of binary cross-entropy and dice coefficient is added as the loss function to each of the above four semantic levels, which is described as:

$$\mathcal{L}(Y, \hat{Y}) = -\frac{1}{N} \sum_{b=1}^{N} \left( \frac{1}{2} \cdot Y_b \cdot \log \hat{Y}_b + \frac{2 \cdot Y_b \cdot \hat{Y}_b}{Y_b + \hat{Y}_b} \right)$$

where $\hat{Y}_b$ and $Y_b$ denote the flattened predicted probabilities and the flattened ground truths of the $b^{th}$ image respectively, and N indicates the batch size.

The UNet++ architecture 100 depicted at FIG. 1A therefore differs from the original U-Net by (1) having convolution layers on skip connection pathways 105 which bridge the semantic gap between encoder backbone 101 and decoder sub-network 102 feature-maps; and further differ by (2) having dense skip connections on skip connection pathways 105 which improves gradient flow; and still further differ by (3) utilizing deep supervision 107 which enables model pruning and improves over the use of only one loss layer or at a minimum, attains comparable performance to using only one loss layer.

Figure 2:
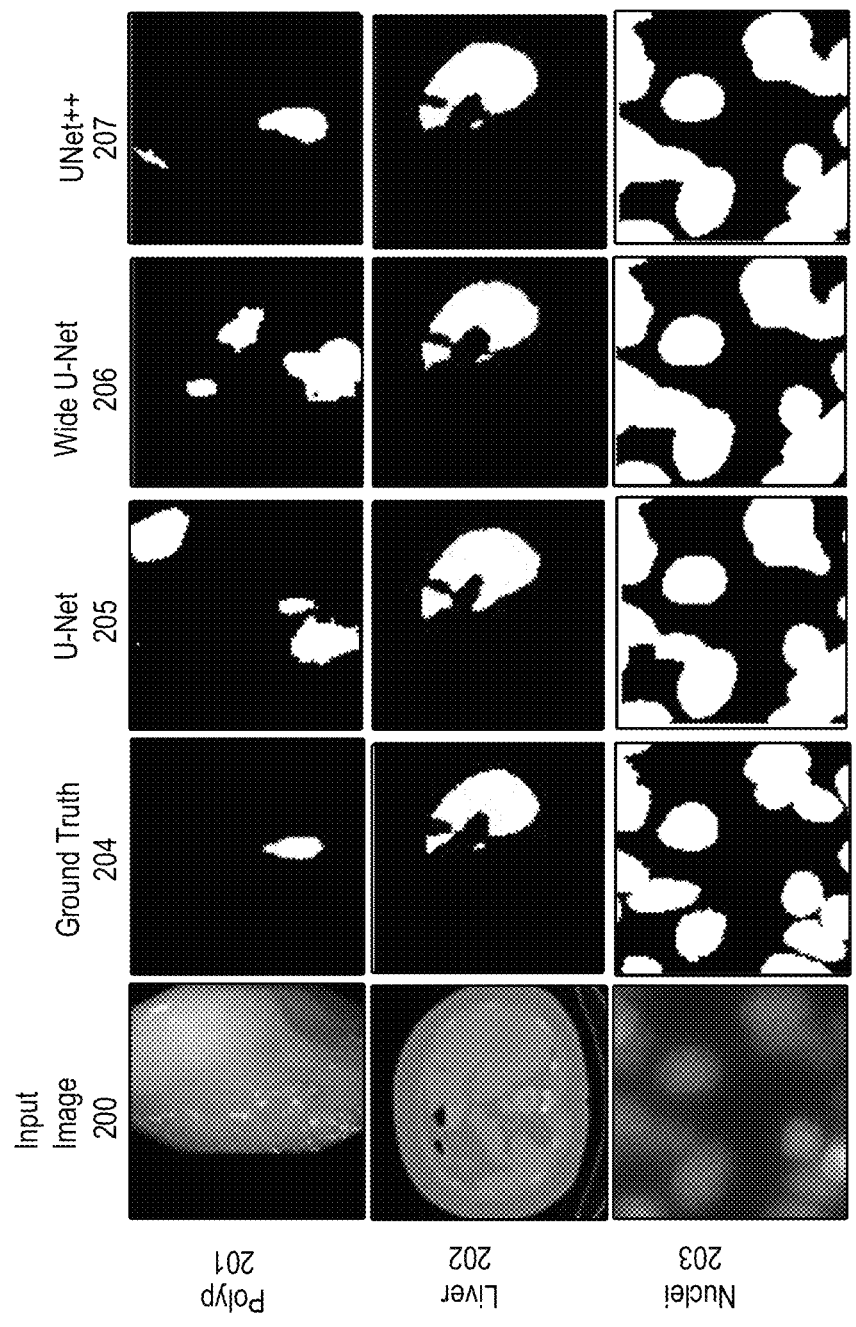
FIG. 2 depicts an exemplary qualitative comparison of image segmentation results between U-Net, wide U-Net, and U-Net++ architectures for polyp, liver and cell nuclei datasets, in a 2D-view for distinct visualization, in accordance with described embodiments.

FIG. 2 depicts an exemplary qualitative comparison of image segmentation results between U-Net, wide U-Net, and U-Net++ architectures for polyp, liver and cell nuclei datasets, in a 2D-view for distinct visualization, in accordance with described embodiments.

Specifically, raw or input images 200 are segmented under each of the three architectures and compared to a ground truth 204 representation. Digital representation 208 depicts an exemplary digitized view of the raw or input images 200 which undergo processing via the three architectures.

As shown here, the UNet++ architecture 207 yields the closest output to accurately representing the ground truth images 204 for each of the polyp 201, liver 202, and nuclei 203. U-Net architecture 205 is the least accurate when compared to the ground truth images 204, followed by wide U-Net architecture 206 which is moderately accurate compared to ground truth images 204 but less accurate than the UNet++ architecture 207 described herein.

Experiments

Datasets: As shown in Table 1, four medical imaging datasets were utilized for experimental model evaluation, covering lesions/organs from different medical imaging modalities.

TABLE 1

Image segmentation datasets used for experiments.

| Dataset | Images | Input Size | Modality | Provider |
| --- | --- | --- | --- | --- |
| cell nuclei | 670 | 96 × 96 | microscopy | Data Science Bowl 2018 |
| colon polyp | 7,379 | 224 × 224 | RGB video | ASU-Mayo |
| liver | 331 | 512 × 512 | CT | MICCAI 2018 LiTS |
| lung nodule | 1,012 | 64 × 64 × 64 CT | | LIDC-IDRI |

Baseline models: For comparison, original U-Net and a customized wide U-Net architecture were utilized. The U-Net architecture was selected as it is a common performance baseline for image segmentation due to its wide adoption within the image processing and segmentation application space. A wide U-Net architecture with a similar number of parameters was further designed and utilized for experiments to ensure that the performance gains yielded by the proposed UNet++ architecture were not simply due to an increased number of parameters.

Table 2, depicts the quantity of convolutional kernels utilized for the U-Net and wide U-Net experiments.

TABLE 2

Number of convolutional kernels in U-Net and wide U-Net.

| | encoder/decoder | | | | |
| --- | --- | --- | --- | --- | --- |
| | $X^{0,0}/X^{0,4}$ | $X^{1,0}/X^{1,3}$ | $X^{2,0}/X^{2,2}$ | $X^{3,0}/X^{3,1}$ | $X^{4,0}/X^{4,0}$ |
| U-Net | 32 | 64 | 128 | 256 | 512 |
| Wide U-Net | 35 | 70 | 140 | 280 | 560 |

Implementation details: For the purposes of the experiments, dice coefficient and Intersection over Union (IoU) were monitored. The experiments employed an early-stop mechanism on the validation set. Further utilized was an Adam optimizer with a learning rate of $3e^{-4}$.

The UNet++ architecture extended the original U-Net architecture by ensuring that convolutional layers along a skip pathway ($X^{i,j}$) use k kernels of size 3×3 (or 3×3×3 for 3D lung nodule segmentation) where $k=32\times2^i$. To enable deep supervision, a 1×1 convolutional layer followed by a sigmoid activation function was appended to each of the target nodes: $\{x^{0,j}|j\in\{1,2,3,4\}\}$. As a result, the UNet++ architecture utilized for experimentation generated four segmentation maps given an input image, which were then further averaged to generate the final segmentation map.

Table 3 shows experimental results comparing U-Net, wide U-Net, and UNet++ architectures in terms of the number parameters and segmentation accuracy for the tasks of lung nodule segmentation, colon polyp segmentation, liver segmentation, and cell nuclei segmentation. Table 3 further provides the segmentation results (IoU %) for U-Net, wide U-Net and for the suggested architecture U-Net++ both with and without deep supervision (DS).

TABLE 3

Experimental results of varying architectures.

| | | Dataset | | | |
| --- | --- | --- | --- | --- | --- |
| Architecture | Params | cell nuclei | colon polyp | liver | lung nodule |
| U-Net | 7.76M | 90.77 | 30.08 | 76.62 | 71.47 |
| Wide U-Net | 9.13M | 90.92 | 30.14 | 76.58 | 73.38 |
| UNet++ w/o DS | 9.04M | 92.63 | 33.45 | 79.70 | 76.44 |
| UNet++ w/ DS | 9.04M | 92.52 | 32.12 | 82.90 | 77.21 |

As shown here, wide U-Net consistently outperforms U-Net except for liver segmentation where the two architectures perform comparably. This improvement is attributed to the larger number of parameters in wide U-Net. The UNet++ architecture without deep supervision achieves a significant performance gain over both U-Net and wide U-Net, yielding average improvement of 2.8 and 3.3 points in IoU, respectively. The UNet++ architecture with deep supervision exhibits average improvement of 0.6 points over the UNet++ architecture without deep supervision. Notably, use of deep supervision leads to marked improvement for liver and lung nodule segmentation, but such improvements are not experimentally observed for cell nuclei and colon polyp segmentation due to the lung and liver nodules appearing at varying scales in video frames and CT slices. Consequently, a multi-scale approach using all segmentation branches (e.g., via deep supervision) is recommended to attain the most accurate segmentation from available imaging data inputs.

Figure 3:
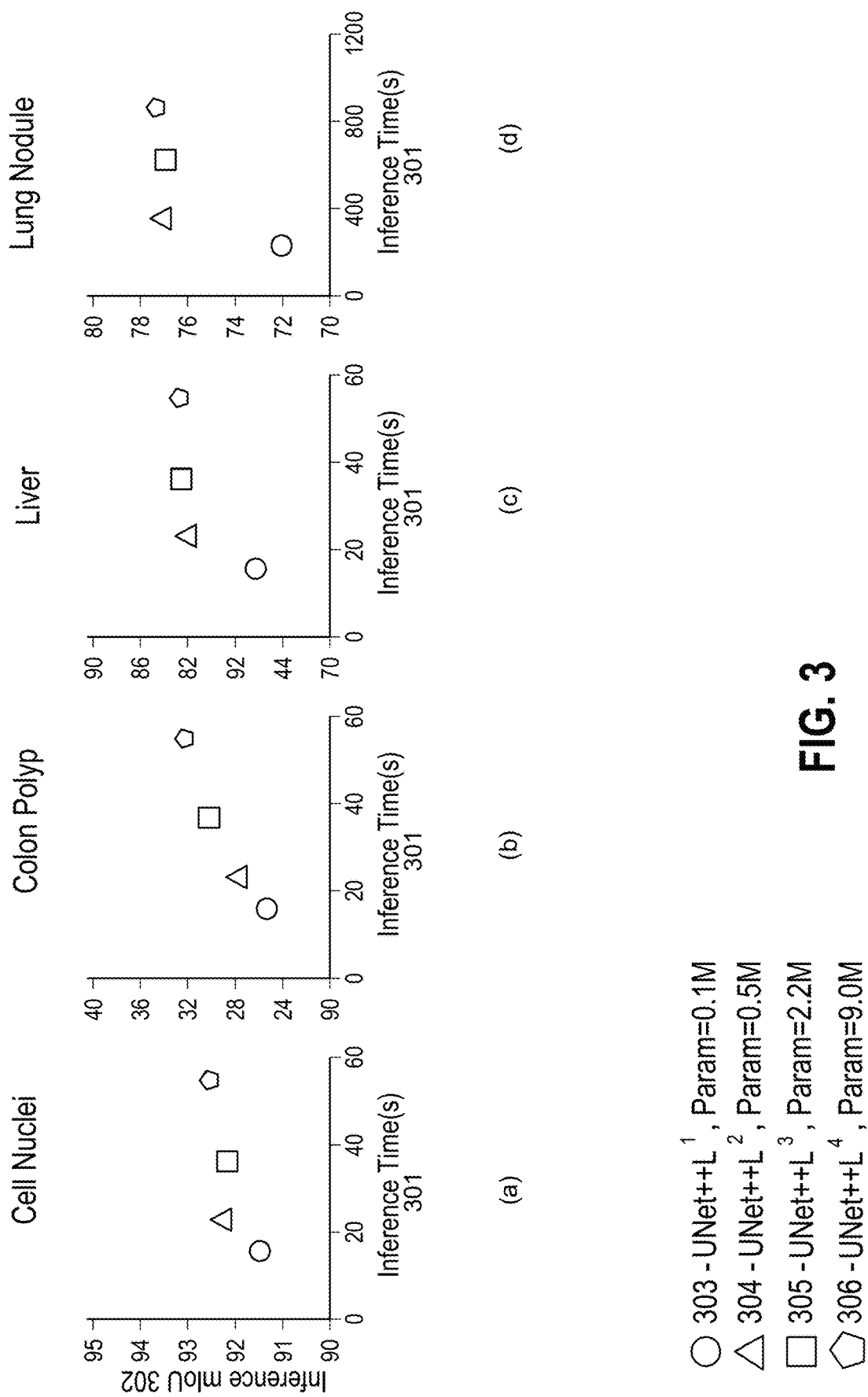
FIG. 3 depicts an exemplary comparison of complexity, speed, and accuracy of UNet++ after pruning on segmentation tasks for various image segmentation tasks, in accordance with described embodiments.

FIG. 3 depicts an exemplary comparison of complexity, speed, and accuracy of the UNet++ architecture after pruning on segmentation tasks for various image segmentation tasks, in accordance with described embodiments.

Model Pruning: Specifically depicted here are comparisons of inference times 301 vs. inference accuracy (inference mIoU (%)) 302 for each of cell nuclei, colon polyp, liver, and lung nodule respectively, at increasing pruning levels corresponding to UNet++$L^1$ (circle 303) UNet++$L^2$ (triangle 304), UNet++$L^3$ (square 305), and UNet++$L^4$ (pentagon 306).

Further depicted is the image segmentation performance of the UNet++ architecture after applying different levels of pruning. For representative experiments, UNet++ $L^i$ was utilized to denote the UNet++ architecture pruned at level i (see also, FIG. 1C). In each graph, the horizontal x-axis represents inference times 301, which is the time taken to process 10K test images using one NVIDIA TITAN X (Pascal) graphics card with 12 GB memory while the inference accuracy (inference mIoU (%)) 302 is presented via the vertical y-axis.

As depicted by graph (c), UNet++ $L^3$, achieves on average a 32.2% reduction in inference time while degrading inference accuracy 302 by only 0.6 points. More aggressive pruning, seen in graph (d) further reduces the inference time but at the cost of significant accuracy degradation. Graph (d) UNet++ $L^4$ exhibits the highest inference times 301 and a lower inference accuracy 302 when compared with graph (c). The lowest level of pruning is observed at graph (a) UNet++ $L^1$ which has the highest inference accuracy 302 for all imaging segmentation.

Inference times 301 are generally observed to be proportionally constant for the various imaging segmentations, with the simpler images such as cell nuclei 303 and colon polyp 304 having lower inference times 301, and more complex images such as liver nodule 305 and lung nodule 306 having higher inference times 301. Cell nuclei 303 also resulted in lower inference accuracy 302 at various levels of pruning compared to other imaging segmentations.

UNet++ advantages: The suggested UNet++ architecture takes advantage of re-designed skip pathways and deep supervision, in which the re-designed skip pathways aim to reduce the semantic gap between the feature-maps of the encoder and decoder sub-networks, resulting in simpler optimization problems for the optimizer to solve. Deep supervision also enables more accurate segmentation, particularly for lesions that appear at multiple scales such as polyps in colonoscopy videos. Experiments demonstrate that the UNet++ architecture with deep supervision achieved an average IoU gain of 3.9 and 3.4 points over U-Net and wide U-Net, respectively.

Accurately segmenting organs and lesions is of great clinical significance in computer-aided diagnosis which may benefit from the application of U-Net and fully convolutional networks (FCNs) variants, and more particularly, use of skip connections. The skip architecture described herein combines deep, coarse, semantic information with shallow, fine, appearance information by encoding location and semantics in a nonlinear local-to-global pyramid. Skip connections therefore not only migrate context spatial information from layers in the contracting path to layers in the expanding path, but additionally help to overcome the vanishing gradient problem, resulting in outstanding performance when applied to medical image segmentation.

Figure 4A:
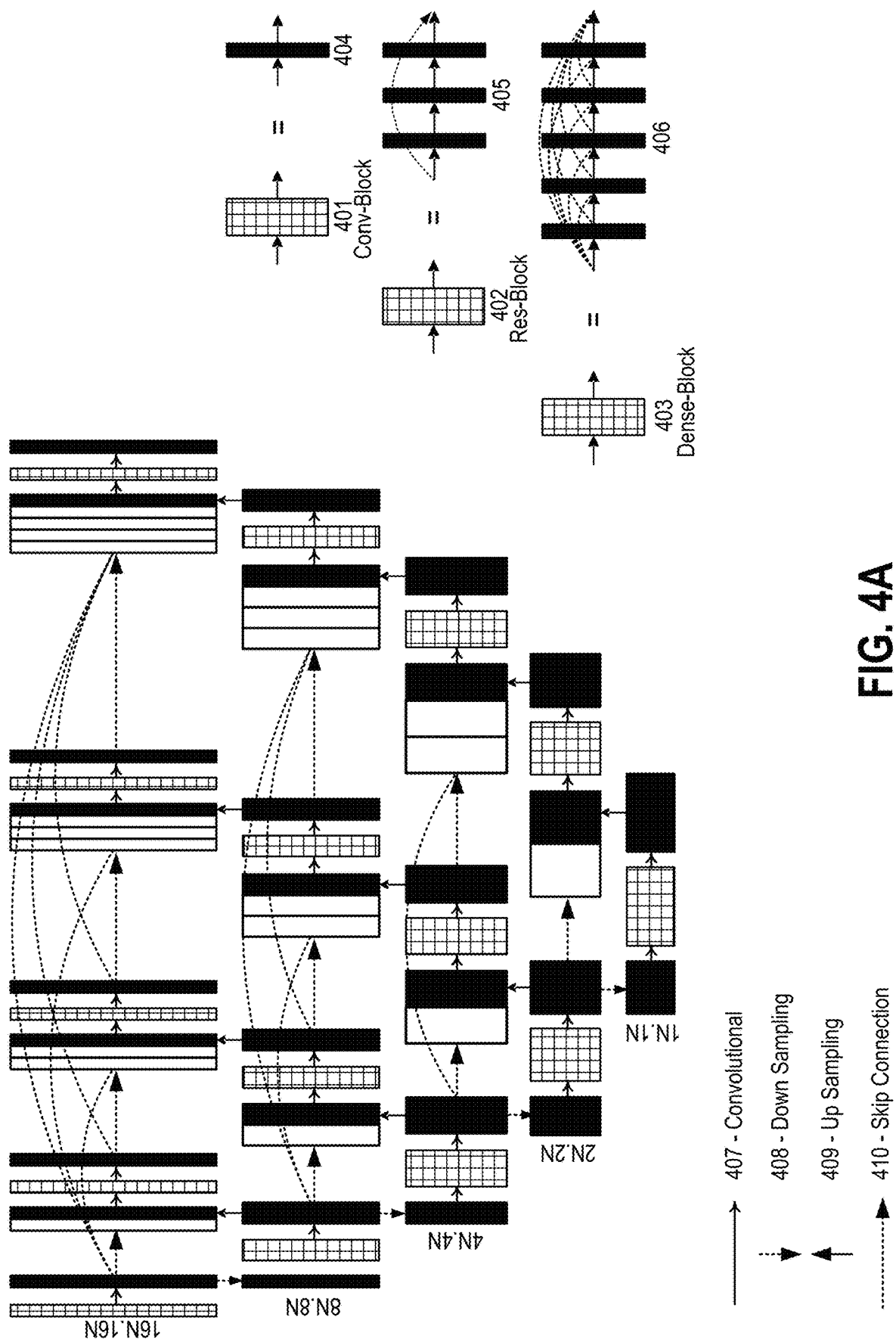
FIG. 4A depicts an exemplary architecture of UNet++ in accordance with described embodiments.

FIG. 4A depicts an exemplary architecture of UNet++ in accordance with described embodiments.

The skip connections described above may hide information gaps in the context of gradient flow, especially in the top skip connection, which connects the first layer in the contracting path and the last layer in the expanding path.

To mitigate information gaps with skip connections the intermediate layers are utilized which naturally form multiple new up-sampling expanding paths, leading to an ensemble of UNet^e architectures (e.g., also referred to as an "Ensemble U-Net") with a partially shared contracting path of different depths. Further still, nesting the UNet^e architectures by densely connecting the intermediate layers at the same resolution across the UNet^e architectures in the ensemble produces a new architecture as shown here, referred to herein as a UNet++ (e.g., nested ensemble nets). As a result, UNet++ naturally smoothes the gradient flows in skip connections. The UNet++ architecture utilizes more parameters, but offers several significant advantages, including: (1) learning a more precise output based on multi-scale information from input images, (2) strengthening multiple resolution features propagation, (3) encouraging feature-map reuse, (4) utilizing implicit multi-scale deep supervision, and (5) accelerating convergence speed.

As depicted here, the various boxes each correspond to a multi-channel feature-map. White boxes represent the result of copied feature-maps concatenated with any other same resolution feature-maps. The convolutional arrows 407 (solid arrows) with solid boxes seen in 404, 405 and 406 denote the basic bottleneck layer. The convolutional arrows 407 with shaded boxes denote the alternative convolutional operations, such as traditional conv-block (Conv-Block) 401, resolution block (Res-Block) 402, and dense block (Dense-Block) 403. The dashed downward arrows represent down-sampling 408, the solid upward arrows represent up-sampling 409, and the sideways (e.g., horizontal and curved) dashed arrows represent skip connections 410.

Figure 4B:
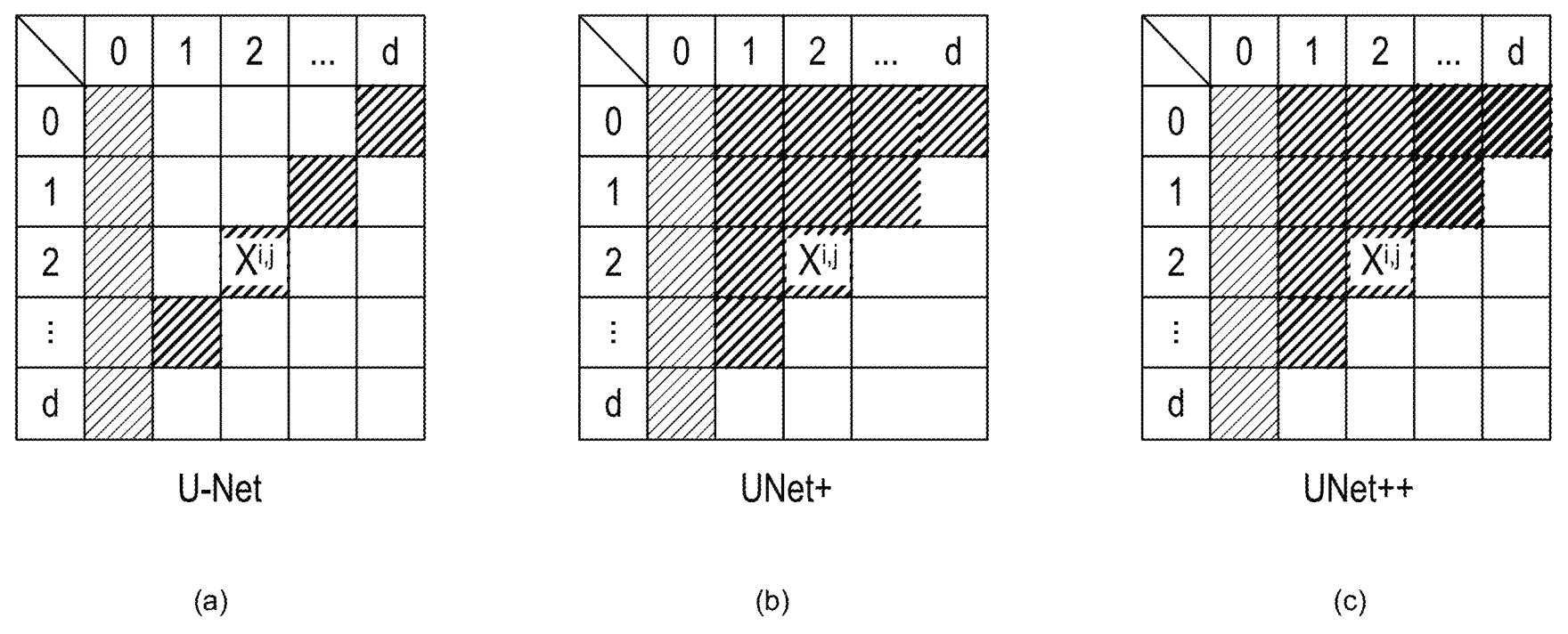

FIG. 4B depicts exemplary topologies of U-Net like, UNet+, and UNet++ architectures, in accordance with described embodiments.

Classical U-Net like architectures as seen in FIG. 4B, graph (a) are built from one single contracting path, extensive paths and d number of skip connections between matching size of feature-maps in contracting path and extensive path, where d is the number of downsampling within the network. The key component skip connections help the extensive path recover spatially detailed information from the contracting path, by reusing feature-maps. The darkness of the respective cells (e.g., the darkness of the shading) corresponds to different underlying quantities of downsampling operations.

Newly introduced intermediate layers in UNet+ depicted in FIG. 4B, graph (b) are only sequentially connected, whereas they are densely connected in UNet++, depicted in FIG. 4B, graph (c).

The model thus exploits the multiple-resolution feature-maps reuse by expanding all d number of level feature-maps to their own extensive path branch and then adding full skip connections among all the matching size feature-maps, resulting in a full ensemble of U-Nets.

Nested Ensemble Networks: To formulate the network's topological structures, consider a single image X that is passed through a d depth segmentation convolutional network to generate an output mask, in which $\mathcal{U}(\cdot)$ is an up-sampling operation. As shown in FIG. 4B, aligning the contracting path to index i=0, and j indicates how many down-sampling operations are applied. The feature-map is defined from expanding path as $X^{i,j}$, where i,j∈[1, d−1]. Therefore, $X^{i,j}$ in d−depth U-Net like architectures may be written as:

$$X^{i,j}=X^{0,j}+u(X^{i-1,j+1}), i=j$$

specifically, resulting in a standard U-Net when d=4. Accordingly, $X^{i,j}$ in d−depth UNet+ can be written as:

$$X^{i,j}=X^{i-1,j}+u(X^{i-1,j+1}), i\leq j$$

and $X^{i,j}$ in d−depth UNet++ may be written as:

$$X^{i,j}=X^{0,j}+X^{1,j}+\ldots+X^{i-1,j}+u(X^{i-1,j+1}), i\leq j.$$

Two notable differences between the UNet+ and UNet++ like architectures networks may therefore be observed. Firstly, extensive path branches are added for all level of resolution feature-maps. Secondly, dense skip connections are made for all the matching feature-maps. In a horizontal view, each of the skip connection may be used as a densely connected feature-maps block which contains both long and short skip connections. Stated differently, in each horizontal direction, as much information as possible is information contained which then traverses through the dense connection, thus making better use of available multi-scaled information.

Backbone of the architecture: Convolutional blocks are utilized in both the contracting paths and expanding paths. With a single bottleneck layer (BN-ELU-1×1-Dropout-BN-ELU-3×3-Dropout) as $\mathcal{B}$, different modified promising convolutional blocks are applied as feature extractors based on image classification results on ImageNet (e.g., Residual Unit and Dense Unit), to demonstrate the fully Nest-Net-like (e.g., UNet+ like architecture) family, extended as Fully Nest-ResNet, Fully-Nest-DenseNet. The nested structures were observed to outperform both the U-Net like architecture family, such as U-ResNet, U-DenseNet and the NestNet-like (e.g., UNet+ like) architecture family, such as Nest-ResNet, Nest-DenseNet. Given $x_l$ as the output of the $l^{th}$ layer within one block, the same definition was followed as with previously known convolution blocks (Cony-Block) 401 methodologies, resolution blocks (Res-Block) 402 methodologies, and dense blocks (Dense-Block) 403 methodologies, as depicted at FIG. 4A, resulting in output $x_l = \mathcal{B}(x_{l-1}) + x_{l-1}$ for Res-Block 402 and $x_l = \mathcal{B}([x_{l-1}, x_{l-2}, \ldots, x_0])$ for Dense-Block 403. Each block follows up with a bottleneck layer $\mathcal{B}$ for a concatenated feature-maps transition from the previous block.

Figure 5:
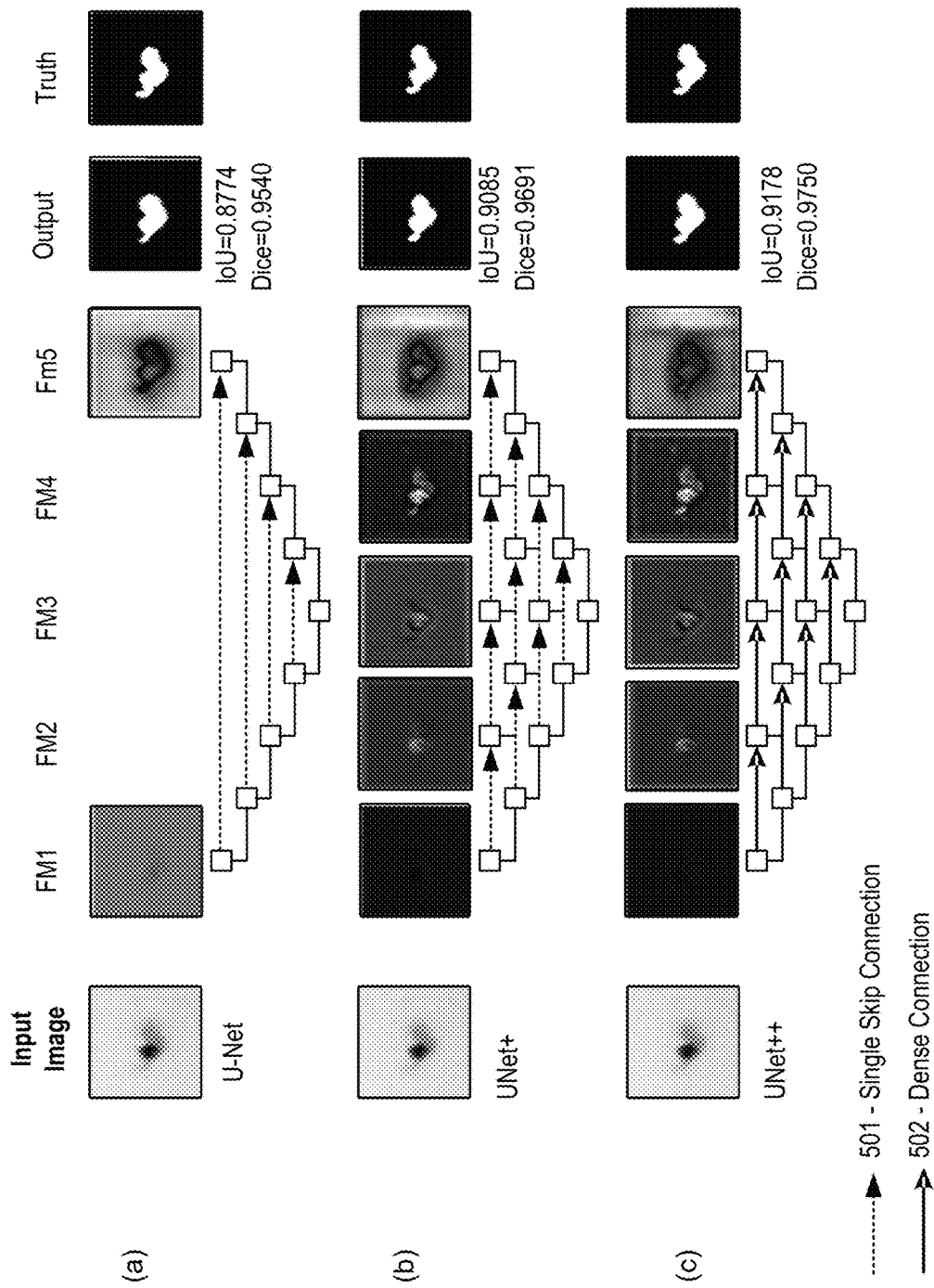
FIG. 5 depicts feature-maps for (a) U-Net, (b) UNet+ and (c) UNet++ including intermediate layers based on the same input, with the outputs of each architecture compared to a truth, in accordance with described embodiments.

FIG. 5 depicts feature-maps for each of the (a) U-Net, (b) UNet+ and (c) UNet++ architectures, including intermediate layers based on the same input, with the outputs of each architecture compared to a truth, in accordance with described embodiments.

Depicted here are Feature Maps (FM) 1 to 4, each representing the expanding path of the (a) U-Net, (b) UNet+ and (c) UNet++ network architectures. As depicted here, all channels are averaged and the intermediate layers are intuitively visualized, in which the dotted arrows denote single skip connection 501 in U-Net and UNet+ architectures, while the dashed rows denote dense connections 502 in UNet++. Observing (a) U-Net feature-maps (e.g., Feature Maps 1 and 5), simply concatenating feature-maps between the one with rich row input information and the one with abstract feature information together causes network confusion and result in vanishing gradient. Based on the featuremaps changing from FM1 to FM 5 and segmentation performance, nesting different level feature-maps was observed to gradually help learn more accurate segmentation and grasp more information.

Intermediate feature-maps: Outputs of different lengths of paths were observed to be largely different in the various U-Net like architectures, as shown at FM 1 and FM 5. Directly adding first and last feature-maps as is done in previously known U-Net methodologies may confuse the network, whereas iteratively concatenating intermediate levels of feature-maps not only contains the information lost from upsampling and downsampling paths, but also provides reuse of the matching level feature information. In addition, deep supervision of the network is provided, by adding a 1×1 convolutional layer with softmax to each U-Net path, and applying back-propagation to minimize a multiple task object function.

Implementation Details: On all datasets, UNet++ has 4-depth nested contracting and expanding paths that each utilize the same type of convolution block (traditional convolution block, residual block or dense block). Following each depth of convolution block, one bottleneck layer is utilized as transition layer and a 1×1 average pooling layer. Experimental results depict an input patch of 96×96, however, the input patch may be any size of $2^d \times \mathcal{N}$, where $\mathcal{N}$ is an integer and d is the depth of the network. The dice coefficient and use of an early-stop was monitored on the validation set. To train the networks, weighted cross-entropy and dice coefficient were employed as the loss function, which is described in Equation 4 as:

$$L(y, \hat{y}) = -\frac{1}{N} \sum_{i=1}^{N} \sum_{c=1}^{|C|} \left( \frac{1}{2} \cdot y_i^c \cdot \log \hat{y}_i^c + \frac{2 \cdot y_i^c \cdot \hat{y}_i^c}{y_i^c + \hat{y}_i^c} \right)$$

where $\hat{y}_i^c$ denotes the probability of pixel i belongs to class c (background or foreground), and $y_i^c$ indicates the ground truth label for pixel i.

Resizing the input data from all database sources to 96×96 and scaling the intensity value into [0,1] for a fair experimental comparison, vertical/horizontal flips and random rotation degree (−10,10) and random scale (0.9,1.1) were then applied for data augmentation on all datasets.

Within a neural network with residual blocks, each layer feeds into the next layer and directly into layers multiple 2-3 hops away. Utilization of residual blocks within the neural network model can improve predictive performances on wide range of tasks.

While increasing a number of layers may improve the accuracy of results, there is nevertheless a practical limit on the overall number of layers that may be introduced to any neural network model. Certain problems such as vanishing gradients and the curse of dimensionality may arise with sufficiently deep networks, and the neural network may not be able to learn simple functions. Yet, simply increasing the number of layers within a neural network model will ultimately lead to accuracy that begins to saturate and then begin to degrade, popularly known as the degradation problem.

In certain ways, shallower networks perform better than the deeper counterparts that have few more layers added, and thus, it may be desirable in certain instances to skip layers. Through the use of skip-connections or residual connections it is therefore possible to skip training of certain layers. While the layers in a traditional network learn the true output. the layers in a residual network are learning the residual of a distribution, hence, the name.

Figure 6:
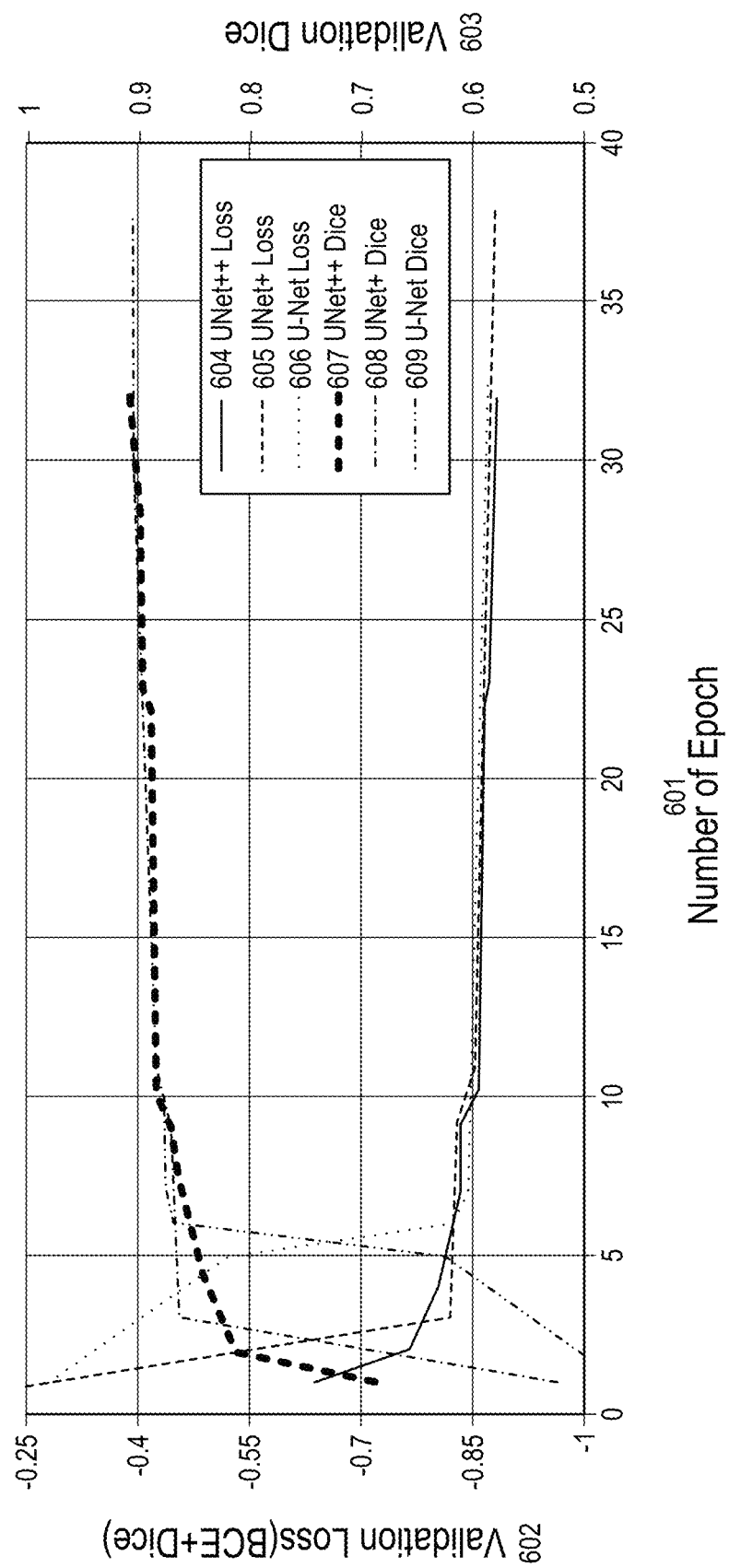
FIG. 6 depicts validation loss and dice coefficient for different network structures along each epoch training stage, in accordance with described embodiments.

FIG. 6 depicts validation loss and dice coefficient for different network structures along each epoch training stage, in accordance with described embodiments.

The number of epoch 601 is plotted against validation loss 602 (based on equation 4, above) and validation dice 603. The validation loss for UNet++ 604 is significantly smaller in magnitude and slope when compared to the validation loss for U-Net 606 and UNet+ 605 which has the sharpest validation loss. Validation loss for all three architectures converge around 12 Epochs and slowly decline, reaching a value around −0.87.

Validation dice 603 is a coefficient that measures similarity and overlap of images with a value of 1 indicating identical, fully overlapping images. The validation dice 603 for all three architectures merge around 10 epochs and plateau together at a validation dice of approximately 0.90 around 20 epochs. UNet+ Dice 608 has the sharpest initial slope and plateaus around 0.90 most quickly, followed by U-Net Dice 609 and UNet++ Dice 607 which has a sharp initial slope but then levels off slowly.

Figure 7:
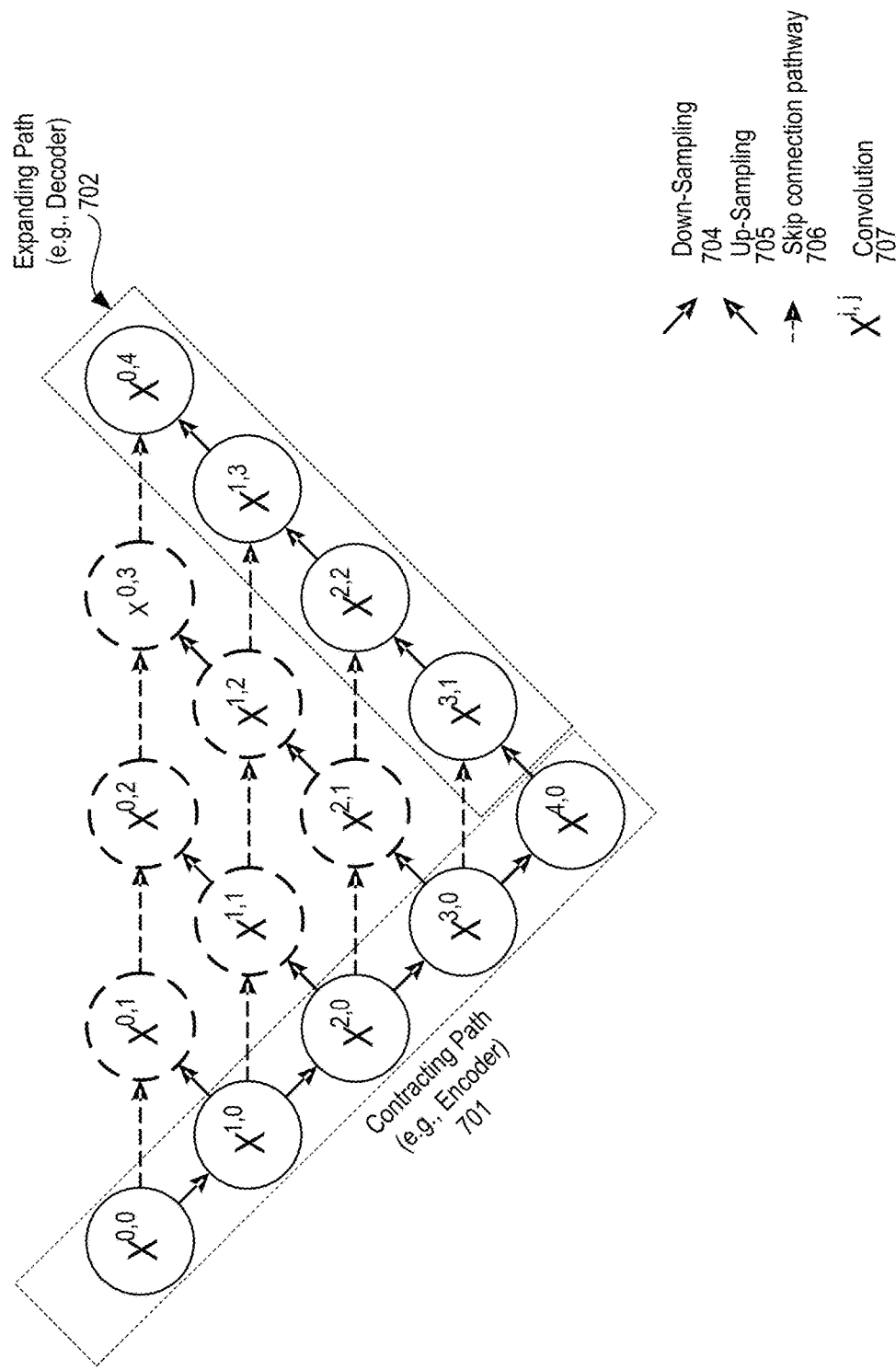
FIG. 7 is a depiction of UNet+ architecture in accordance with described embodiments.

FIG. 7 is a depiction of UNet+ architecture in accordance with described embodiments.

The UNet+ architecture depicted here introduces intermediate layers via convolution blocks into skip connections between contracting 701 and expanding 702 paths of a general encoder-decoder network, which combines both long and short skip connections of the intermediate matching size feature-maps. Each dashed circle and solid circle is a convolution block corresponding to a convolution component $X^{i,j}$ 707 where multi-channel feature-maps traverse. Bold arrows represent the down-sampling 704 and up-sampling 705 operations respectively within the encoder-decoder network, while the dashed arrows 706 represent skip connections, and the copied feature-maps merged with any other same resolution feature-maps via concatenation or summation. Encoder network 701 denotes generalized transfer learning which can either include an alternative feature generators backbone, such as VGG-16 and ResNet-101, or include a meta segmentation pipeline, for example, Mask RCNN.

Figure 8:
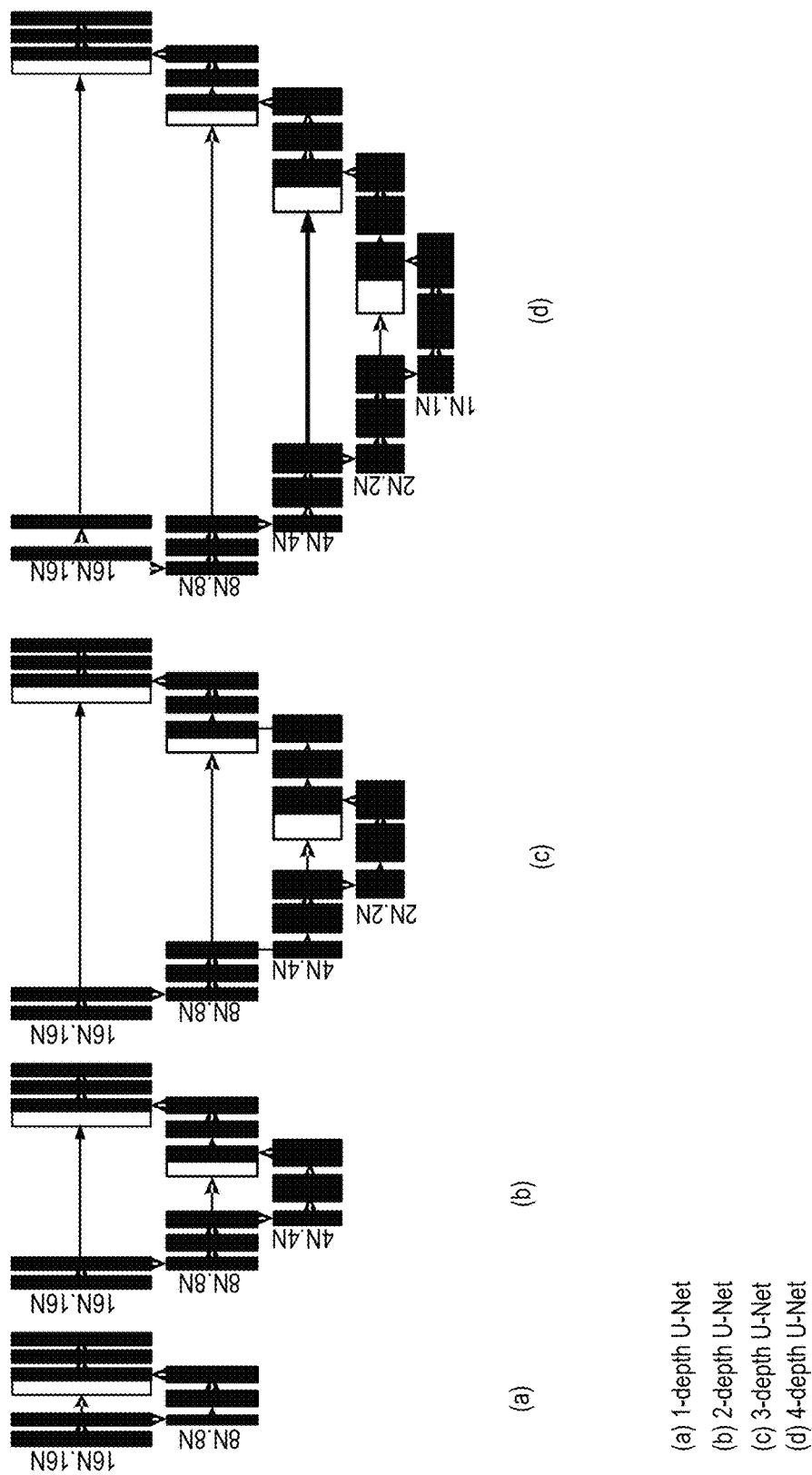
FIG. 8 depicts visual comparisons between varying depth U-Net architectures ranging from 1-depth to 4-depth, in accordance with described embodiments.

FIG. 8 depicts visual comparisons between varying depth U-Net architectures ranging from 1-depth to 4-depth, in accordance with described embodiments.

Specifically, FIG. 8 depicts standard independent U-Net architectures of different depths via graphs (a)-(d), with each additional depth adding a row of intermediate layers comprising feature-maps.

Figure 9:
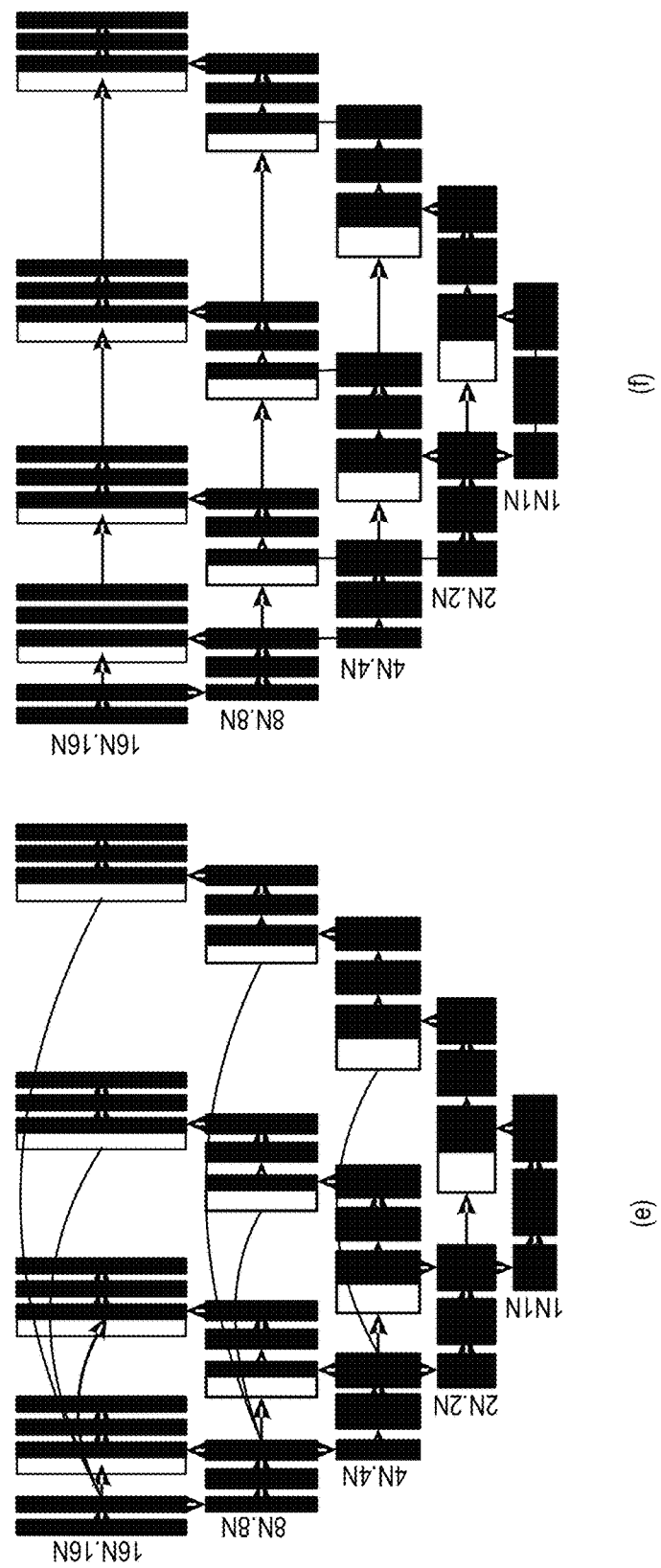
FIG. 9 depicts further visual comparisons between UNet^e and UNet+, in accordance with described embodiments.

FIG. 9 depicts further visual comparisons between UNet^e and UNet+, in accordance with described embodiments.

At FIG. 9, Graph (e) depicts an ensemble of 4-different-depth U-Nets e.g., a UNet^e) with a shared contracting path and graph (f) depicts the architecture of UNet+, which sequentially connects same resolution of feature-maps, without the long skip connections (arched arrows). Note that training the depicted nets in FIG. 8 and FIG. 9 utilizes explicit deep supervision, whereas deep supervision is an optional variant for training the nets depicted at FIG. 4A.

Differences between UNet++ and U-Net networks include the addition of expanding path branches for all levels of resolution feature-maps and the inclusion of dense skip connections for all the matching feature-maps.

The U-Net architecture and its variants as described herein provide a Fully Convolutional Network (FCN) capable of performing image segmentation, with the goal of predicting each pixel's class for all pixels of an input image. The U-Net architecture and its variants modify FCNs to yield better segmentation of images, especially with regard to use with medical imaging, with such modifications permitting U-Net architectures to operate symmetrically and to utilize skip connections between downsampling paths and upsampling paths by applying a concatenation operator rather than a sum. Such skip connections provide local information to the global information while upsampling and owing to the symmetry of the U-Net architecture variants, the resulting neural network has a large number of feature maps in the upsampling path, which enables greater transfer of information, whereas conventional FCN architectures are limited to only a number of classes feature maps in the upsampling path.

The U-Net architecture variants are generally separated in 3 parts, including the contracting/downsampling path, the bottleneck, and the expanding/upsampling path. The contracting/downsampling path operates to capture the context of the input image so as to facilitate image segmentation, resulting in coarse contextual information which is then transferred to the upsampling path by means of skip connections.

The bottleneck portion of the network resides between the contracting and expanding paths.

The expanding/upsampling path enables the neural network to perform precise localization combined with the contextual information transferred from the contracting/downsampling path by way of the skip connections.

In such a way, U-Net architectural variants combine the location information from the downsampling path with the contextual information in the upsampling path to obtain a general information combining localization and context, so as to improve predictive output rendered from a segmentation map.

Through the process of image segmentation, an appropriately configured system executing the neural network architectures as described herein operates to "partition" an input image different segments, each of them representing a different entity or element of interest within the input image. While medical imaging is somewhat complex, consider the more simplistic example of a self-driving vehicle, which seeks to separate, partition, or segment an input image into useable image components, such as differentiating vehicles and pedestrians from a background. Once the image is segmented, those identified image elements may then be utilized to perform some computational task, such as steering a vehicle. While medical imaging is more complex as the human physiology exhibits many nuances and image subtleties, which may be difficult for even trained physicians to differentiate, once the image elements are segmented and identified, various tasks may be performed, such as generating a predicted diagnosis based on the input image.

Thus, an appropriately configured machine or system, such as those described herein, through the execution of improved neural networks may therefore operate to identify and predict with greater accuracy, the elements of concern within an input image within the context of medical imaging.

Figure 10:
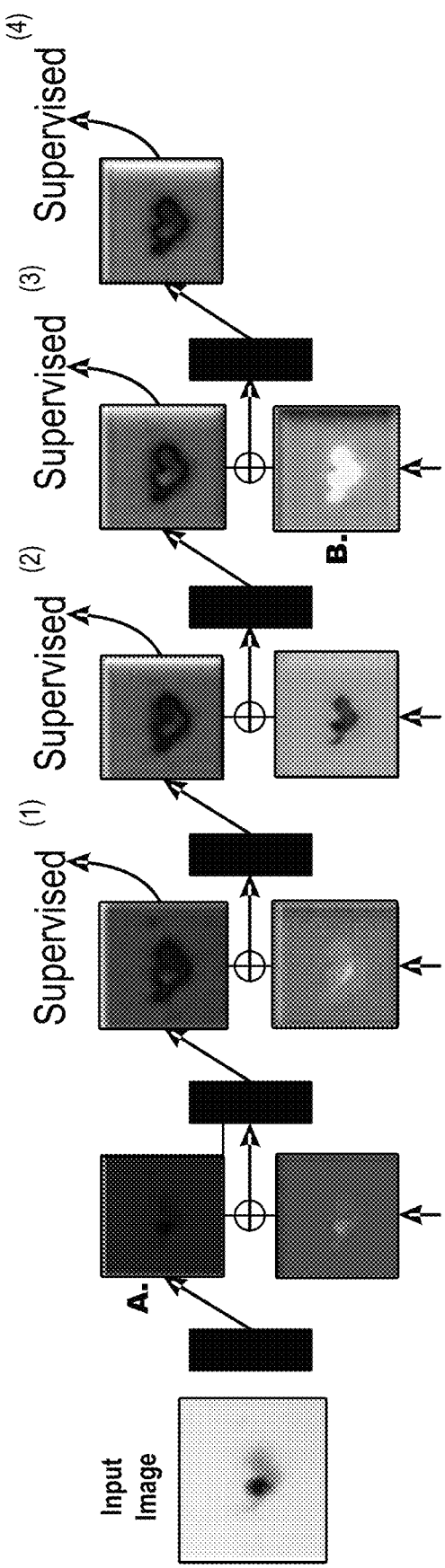
FIG. 10 is a visualization of intermediate feature-maps concatenation and flow along the top components of a nested network, in accordance with described embodiments.

FIG. 10 is a visualization of intermediate feature-maps concatenation and flow along the top components of a nested network, in accordance with described embodiments.

Directly summing up or concatenating first and last feature-maps as proposed in U-Net may confuse the network. Therefore, iteratively concatenating intermediate levels of feature-maps not only operates to contain the information lost from up-sampling and down-sampling paths, but also permits reuse of the matching level feature information. The nested network has the ability to smooth the information flow compared to U-Net architecture, which concatenates map A and map B together directly.

Map A (depicted at top left) represents the feature-map for the input image that goes through only one convolutional block, while map B (depicted at lower right) represents the feature-map for the input image which goes through a sequence of convolutional blocks including 4 downsampling and 4 upsampling blocks. Therefore, notwithstanding each having a same resolution, the information produced is asymmetrical. The depth d=1 condition is further shown; this phenomenon exists in other depth conditions, in which the larger the depth the more asymmetric the feature-map becomes.

Use of visualizing depth d=0 for feature-maps is further depicted, in which the standard U-Net architecture concatenates feature-map A and B together following up with a successive convolution layer. However, when the network becomes deeper, the information gap between feature-maps A and B will be enlarged and ultimately influence the gradient flow between them. To address this problem, intermediate layers and skip connections between them are introduced. Output for different path lengths were observed to be largely different in encoder-decoder architectures (see FIG. 3) with the path between $X^{0,0}$ and $X^{0,4}$.

The visualization of intermediate feature-maps concatenation and flow along the top components of nested network as depicted here is performed at depth d=0. Map A is the feature-map for the input image that goes through only one convolutional block, while map B is the feature-map for the input image that goes through a sequence of convolutional blocks including four downsampling and four upsampling blocks, resulting in asymmetrical feature maps, despite the same resolution input.

Deep supervision: Further depicted here is a deep supervision mechanism is introduced during the learning process to combat potential optimization difficulties, thus the model shown here attains a much faster convergence rate and more powerful discrimination capability. Advantages include accelerating the optimization convergence rate and further include improved prediction accuracy. During the testing phase, the network structure is pruned according to validation performance, achieving a balance between accuracy and speed.

Vanishing gradients can make the loss back-propagation ineffective in early layers, which may be even more severe with the use of 3D situations and may slow convergence rates and reduce discrimination capabilities of the model. So as to negate such potential issues, additional supervision is injected into the hidden layers to counteract the adverse effects of gradient vanishing.

Additionally, a lack of deep supervision may result in the features produced at hidden layers that less semantically meaningful. So as to negate any potential issues, certain embodiments utilize deep supervision layers to improve the learning ability of the hidden layers.

FIG. 11A depicts examples of cell segmentation intermediate feature-maps and predictions of U-Net, UNet+ and UNet++ without deep supervision, in accordance with described embodiments.

The dotted arrows denote single skip connections 1101 in U-Net architecture (a) and UNet+ architecture (b) the dashed arrows 1102 denote dense connections in UNet++ architecture (c).

Intermediate feature-maps visualization and analysis: Output for direct paths under U-Net like architecture is largely different than other architectures, as shown by U-Net architecture (a) at Feature-Maps FM 1 and FM 5. Directly adding the first and last feature-maps as proposed in U-Net may confuse the network, whereas iteratively concatenating intermediate level feature-maps, as seen in UNet+ architecture (b) and UNet++ architecture (c), respectively, not only contains the information normally lost from upsampling and downsampling paths, but also allows for reuse of matching level feature information. This is evidenced by progressively higher IoU and Dice values for UNet+ and UNet++ as compared to U-Net, seen when comparing the respective values in UNet+ architecture (b) and UNet++ architecture (c) to that of the U-Net architecture (a).

Figure 11B:
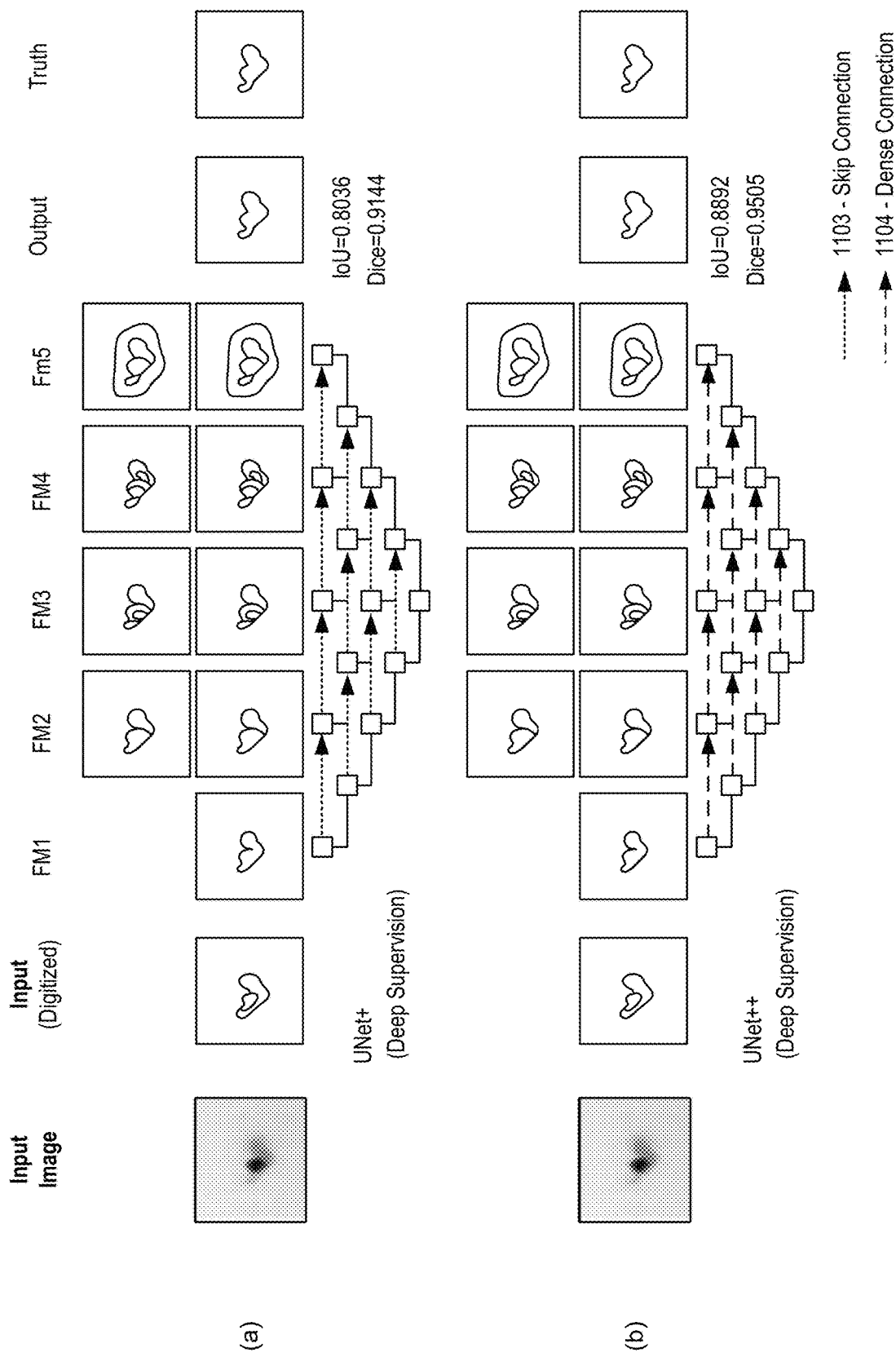
FIG. 11B depicts examples of cell segmentation intermediate feature-maps and predictions of UNet+ and UNet++ with deep supervision, in accordance with described embodiments.

FIG. 11B depicts examples of cell segmentation intermediate feature-maps and predictions of UNet+ and UNet++ with deep supervision, in accordance with described embodiments.

The dotted arrows denote single skip connections 1103 in UNet+ architecture (a) and the dashed arrows 1104 denote dense connections in UNet++ architecture (b).

Deep supervision of the networks is introduced here by adding a 1×1 sigmoid convolutional layer to each U-Net path, and applying back-propagation to minimize a multiple task object function. As a result, slightly increased IoU scores (0.8892 vs. 0.8843) and similar dice scores (0.9505 vs. 0.9560) are observed for UNet++ (b) with deep supervision when compared to UNet++ without deep supervision as shown at UNet++ architecture (c) of FIG. 11A. When comparing UNet+ architecture (a) with deep supervision in FIG. 11B to UNet+ architecture (b) without deep supervision in FIG. 11A, slightly decreased IoU and dice scores are observed for UNet+ with deep supervision (decreasing from an IoU score of 0.8778 to 0.8036 and dice score of 0.9560 to 0.9505 when deep supervision is added to UNet+).

Figure 12:
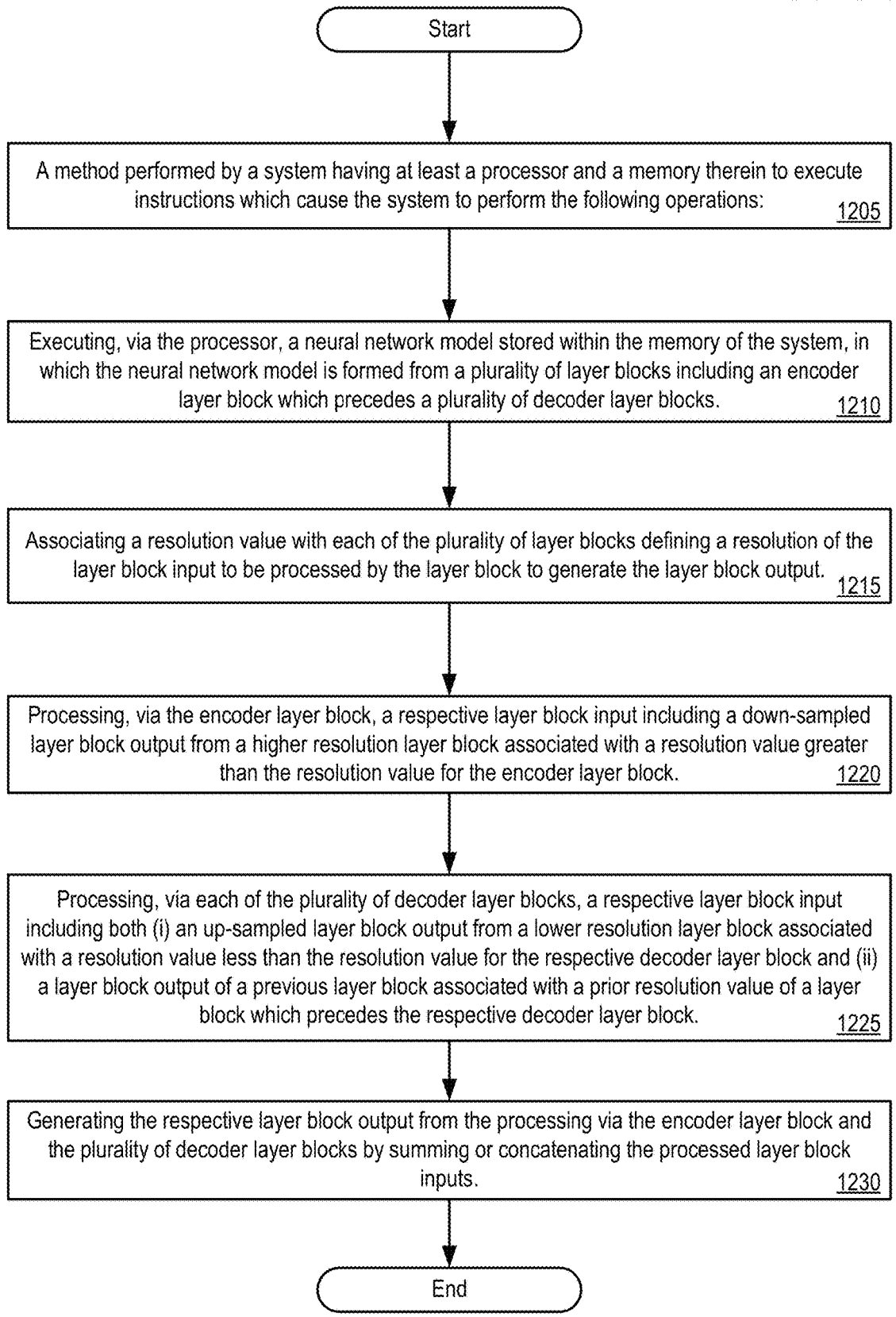
FIG. 12 depicts a flow diagram illustrating a method for implementing a multi-resolution neural network for use with imaging intensive applications including medical imaging, in accordance with disclosed embodiments.

FIG. 12 depicts a flow diagram illustrating a method 1200 for implementing a multi-resolution neural network for use with imaging intensive applications including medical imaging, in accordance with disclosed embodiments. Method 1200 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the system 1301 (see FIG. 13) and the machine 1401 (see FIG. 14) and the other supporting systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1200 depicted at FIG. 12 beginning at block 1205, there is a method performed by a system having at least a processor and a memory therein to execute instructions which cause the system to perform the following operations:

At block 1210, processing logic executes, via the processor, a neural network model stored within the memory of the system, in which the neural network model is formed from a plurality of layer blocks including an encoder layer block which precedes a plurality of decoder layer blocks.

At block 1215, processing logic associates a resolution value with each of the plurality of layer blocks defining a resolution of the layer block input to be processed by the layer block to generate the layer block output.

At block 1220, processing logic processes, via the encoder layer block, a respective layer block input including a down-sampled layer block output from a higher resolution layer block associated with a resolution value greater than the resolution value for the encoder layer block.

At block 1225, processing logic processes, via each of the plurality of decoder layer blocks, a respective layer block input including both (i) an up-sampled layer block output from a lower resolution layer block associated with a resolution value less than the resolution value for the respective decoder layer block and (ii) a layer block output of a previous layer block associated with a prior resolution value of a layer block which precedes the respective decoder layer block.

At block 1230, processing logic generates the respective layer block output from the processing via the encoder layer block and the plurality of decoder layer blocks by summing or concatenating the processed layer block inputs.

According to another embodiment of method 1200, each of the plurality of layer blocks include one or more neural network layers configured to process a respective layer block input and responsively generate a corresponding layer block output.

According to another embodiment of method 1200, generating the respective layer block output comprises concatenating the processed layer block inputs via a concatenation layer that fuses the respective layer block output from the previous layer block associated with the prior resolution value within a common dense block with a corresponding up-sampled layer block output from a lower dense block.

According to another embodiment, method 1200 further includes: outputting feature-maps from the processing via the encoder layer block; and receiving the output featuremaps from the encoder layer block for processing via the plurality of decoder layer blocks via skip pathways between nodes within the neural network model.

According to another embodiment, method 1200 further includes: ordering the plurality of layer blocks of the neural network to position the encoder layer block prior to the plurality of decoder layer blocks; and ordering each of the plurality of decoder layer blocks of different resolution values based on the associated resolution value for each decoder layer block.

According to another embodiment of method 1200, processing, via each of the plurality of decoder layer blocks further comprises each decoder layer block processing layer block outputs from every previous layer block associated with a resolution value preceding the resolution value associated with the respective decoder layer block performing the processing based on the ordering.

According to another embodiment, method 1200 further includes: generating, from each of the plurality of decoder layer blocks associated with a highest resolution value, a layer block output defining a decoder output of the neural network model; and generating a final output from the neural network model using the defined decoder outputs generated by the plurality of decoder layer blocks, each associated with the highest resolution value.

According to another embodiment of method 1200, generating the final output from the neural network model using the defined decoder outputs generated by the plurality of decoder layer blocks, each associated with the highest resolution value comprises one of: averaging the defined decoder outputs to generate the final output from the neural network model; or alternatively selecting one of the defined decoder outputs generated by the plurality of decoder layer blocks based on configurable implementation parameters of the neural network model.

According to another embodiment, method 1200 further includes: training the neural network model using machine learning training to optimize an objective function; and wherein the objective function comprises a respective loss term corresponding to layer block outputs from each of the plurality of decoder layer blocks of the executing neural network model.

According to another embodiment of method 1200, each layer block output from each of the plurality of decoder layer blocks of the executing neural network model is a respective estimate of a segmentation map of an input image processed by the neural network model; and wherein the respective loss term corresponding to each layer block output from each of the plurality of decoder layer blocks of the executing neural network model comprises a cross-entropy term and a dice coefficient term.

According to another embodiment of method 1200, the method further comprises: receiving the input image for image segmentation processing at the system via the executing neural network model; and wherein the input image comprises a medical image.

According to another embodiment of method 1200, one or more of the plurality of layer blocks include a plurality of convolutional layers; wherein each of the plurality of convolutional layers is configured to process a layer input comprising the outputs of each previous convolutional layer in the layer block; and wherein a different one or more of the plurality of layer blocks are residual blocks.

According to a particular embodiment, there is a non-transitory computer readable storage medium having instructions stored thereupon that, when executed by a system having at least a processor and a memory therein, the instructions cause the processor to perform operations including: executing, via the processor, a neural network model stored within the memory of the system; wherein the neural network model is formed from a plurality of layer blocks including an encoder layer block which precedes a plurality of decoder layer blocks; associating a resolution value with each of the plurality of layer blocks defining a resolution of the layer block input to be processed by the layer block to generate the layer block output; processing, via the encoder layer block, a respective layer block input including a down-sampled layer block output from a higher resolution layer block associated with a resolution value greater than the resolution value for the encoder layer block; processing, via each of the plurality of decoder layer blocks, a respective layer block input including both (i) an up-sampled layer block output from a lower resolution layer block associated with a resolution value less than the resolution value for the respective decoder layer block and (ii) a layer block output of a previous layer block associated with a prior resolution value of a layer block which precedes the respective decoder layer block; and generating the respective layer block output from the processing via the encoder layer block and the plurality of decoder layer blocks by summing or concatenating the processed layer block inputs.

Figure 13:
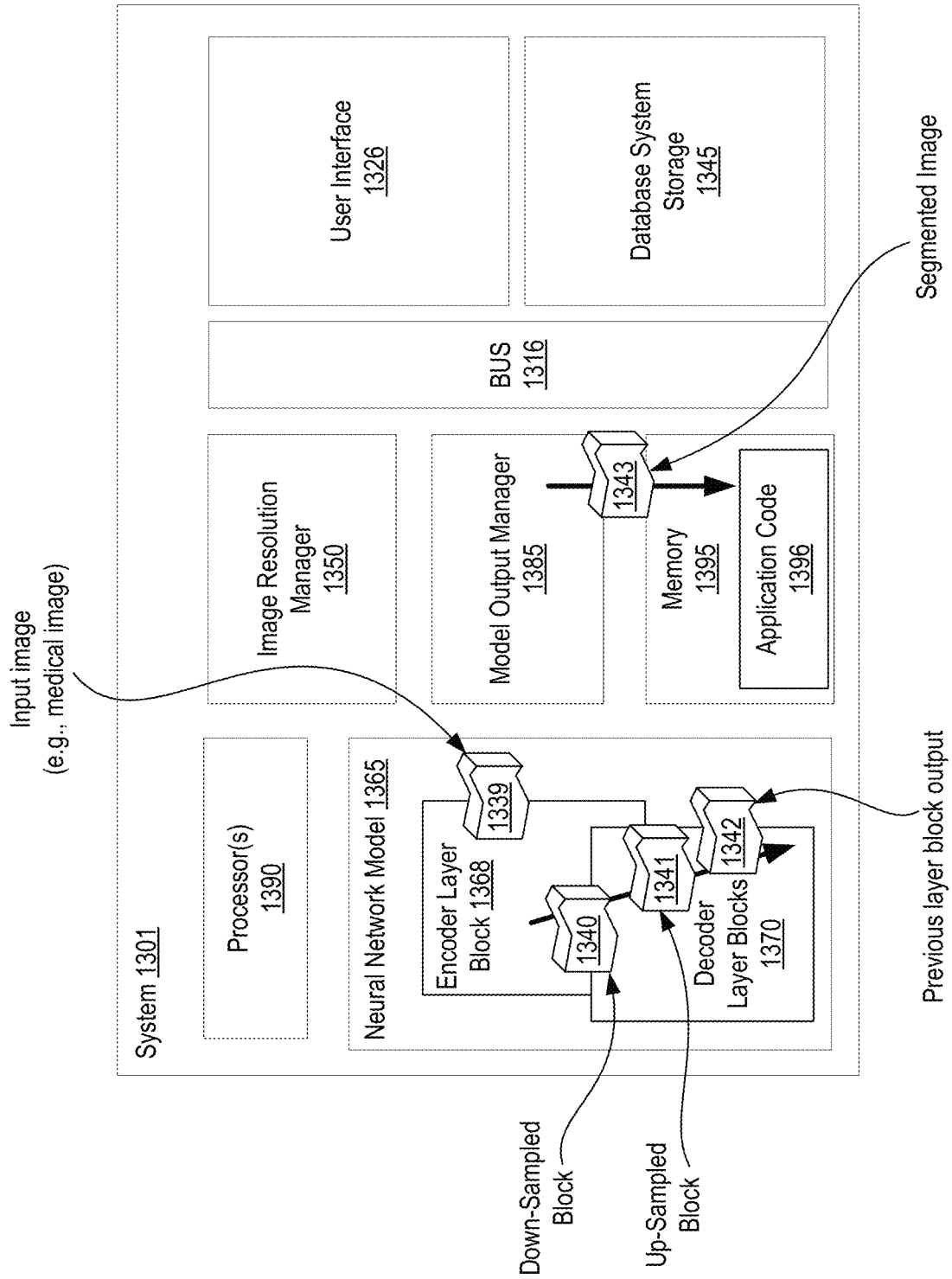
FIG. 13 shows a diagrammatic representation of a system within which embodiments may operate, be installed, integrated, or configured in accordance with described embodiments.

FIG. 13 shows a diagrammatic representation of a system 1301 within which embodiments may operate, be installed, integrated, or configured. In accordance with one embodiment, there is a system 1301 having at least a processor 1390 and a memory 1395 therein to execute implementing application code 1396. Such a system 1301 may communicatively interface with and cooperatively execute with the benefit of remote systems, such as a user device sending instructions and data, a user device to receive segmented image 1343 output from the model output manager 1385 of the system, or systems within a networked or within a client-server environment, etc.

According to the depicted embodiment, the system 1301, includes the processor 1390 and the memory 1395 to execute instructions at the system 1301 and operates to implement a multi-resolution neural network for use with imaging intensive applications including medical imaging. According to such an embodiment, the system 1301 further includes the processor 1390 to execute a neural network model 1365 stored within the memory 1395 of the system 1301, in which the neural network model 1365 is formed from a plurality of layer blocks including an encoder layer block 1368 which precedes a plurality of decoder layer blocks 1370. Within such a system, the processor is further to execute an image resolution manager 1350 to associate a resolution value with each of the plurality of layer blocks defining a resolution of the layer block input to be processed by the layer block to generate the layer block output. The processor 1390 of the system 1301 is further to execute the encoder layer block 1368 to process a respective layer block input including a down-sampled layer block 1340 output from a higher resolution layer block associated with a resolution value greater than the resolution value for the encoder layer block. The processor is to further execute each of the plurality of decoder layer blocks 1370 to process a respective layer block input including both (i) an up-sampled layer block 1341 output from a lower resolution layer block associated with a resolution value less than the resolution value for the respective decoder layer block and (ii) a layer block output of a previous layer block 1342 associated with a prior resolution value of a layer block which precedes the respective decoder layer block. According to such an embodiment of the system 1301, the processor 1390 is further to execute a model output manager 1385 to generate the respective layer block output from the processing via the encoder layer block and the plurality of decoder layer blocks by summing or concatenating the processed layer block inputs.

The model output manager 1385 may further transmit output back to a user device or other requestor, for example, via the user interface 1326, including sending a segmented image 1343 representation of the input image 1339 (e.g., a medical image) to a user device or other requestor, or such information may alternatively be stored within the database system storage 1345 of the system 1301.

According to another embodiment of the system 1301, a user interface 1326 communicably interfaces with a user client device remote from the system and communicatively interfaces with the system via a public Internet.

Bus 1316 interfaces the various components of the system 1301 amongst each other, with any other peripheral(s) of the system 1301, and with external components such as external network elements, other machines, client devices, cloud computing services, etc. Communications may further include communicating with external devices via a network interface over a LAN, WAN, or the public Internet.

Figure 14:
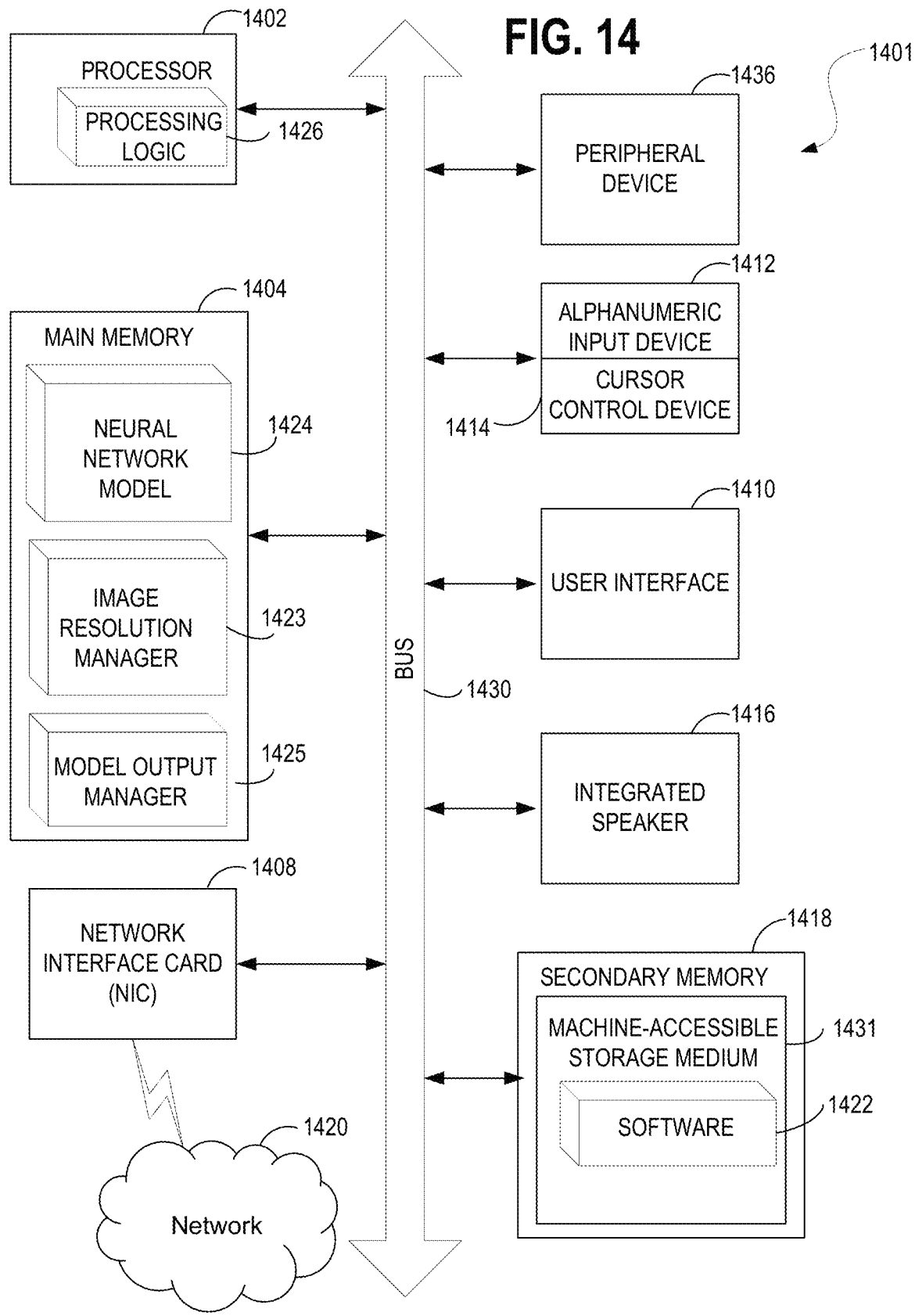
FIG. 14 illustrates a diagrammatic representation of a machine in the exemplary form of a computer system, in accordance with one embodiment.

FIG. 14 illustrates a diagrammatic representation of a machine 1401 in the exemplary form of a computer system, in accordance with one embodiment, within which a set of instructions, for causing the machine/computer system 1401 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1401 includes a processor 1402, a main memory 1404 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1418 (e.g., a persistent storage device including hard disk drives and a persistent database and/or a multi-tenant database implementation), which communicate with each other via a bus 1430. Main memory 1404 includes a neural network model 1424 and an image resolution manager 1423 and a model output manager 1425 which operate to implement a multi-resolution neural network for use with imaging intensive applications including medical imaging in support of the methodologies and techniques described herein. Main memory 1404 and its sub-elements are further operable in conjunction with processing logic 1426 and processor 1402 to perform the methodologies discussed herein.

Processor 1402 represents one or more specialized and specifically configured processing devices such as a microprocessor, central processing unit, or the like. More particularly, the processor 1402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1402 may also be one or more special-purpose processing devices such as an application specific integrated circuit (ASIC), a field programmable gate array (FPGA), a digital signal processor (DSP), network processor, or the like. Processor 1402 is configured to execute the processing logic 1426 for performing the operations and functionality which is discussed herein.

The computer system 1401 may further include a network interface card 1408. The computer system 1401 also may include a user interface 1410 (such as a video display unit, a liquid crystal display, etc.), an alphanumeric input device 1412 (e.g., a keyboard), a cursor control device 1414 (e.g., a mouse), and a signal generation device 1416 (e.g., an integrated speaker). The computer system 1401 may further include peripheral device 1436 (e.g., wireless or wired communication devices, memory devices, storage devices, audio processing devices, video processing devices, etc.).

The secondary memory 1418 may include a non-transitory machine-readable storage medium or a non-transitory computer readable storage medium or a non-transitory machine-accessible storage medium 1431 on which is stored one or more sets of instructions (e.g., software 1422) embodying any one or more of the methodologies or functions described herein. The software 1422 may also reside, completely or at least partially, within the main memory 1404 and/or within the processor 1402 during execution thereof by the computer system 1401, the main memory 1404 and the processor 1402 also constituting machine-readable storage media. The software 1422 may further be transmitted or received over a network 1420 via the network interface card 1408.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system having at least a processor and a memory therein to execute instructions, wherein the method comprises:

executing, via the processor, a neural network model stored within the memory of the system;

wherein the neural network model is formed from a plurality of layer blocks including an encoder layer block which precedes a plurality of decoder layer blocks;

associating a resolution value with each of the plurality of layer blocks defining a resolution of the layer block input to be processed by the layer block to generate the layer block output;

processing, via the encoder layer block, a respective layer block input including a down-sampled layer block output from a higher resolution layer block associated with a resolution value greater than the resolution value for the encoder layer block;

processing, via each of the plurality of decoder layer blocks, a respective layer block input including both (i) an up-sampled layer block output from a lower resolution layer block associated with a resolution value less than the resolution value for the respective decoder layer block and (ii) a layer block output of a previous layer block associated with a prior resolution value of a layer block which precedes the respective decoder layer block; and generating the respective layer block output from the processing via the encoder layer block and the plurality of decoder layer blocks by summing or concatenating the processed layer block inputs.

2. The method of claim 1, wherein each of the plurality of layer blocks include one or more neural network layers configured to process a respective layer block input and responsively generate a corresponding layer block output.

3. The method of claim 1, wherein generating the respective layer block output comprises concatenating the processed layer block inputs via a concatenation layer that fuses the respective layer block output from the previous layer block associated with the prior resolution value within a common dense block with a corresponding up-sampled layer block output from a lower dense block.

4. The method of claim 1, further comprising:
outputting feature-maps from the processing via the encoder layer block; and
receiving the output feature-maps from the encoder layer block for processing via the plurality of decoder layer blocks via skip pathways between nodes within the neural network model.

5. The method of claim 1, further comprising:
ordering the plurality of layer blocks of the neural network to position the encoder layer block prior to the plurality of decoder layer blocks; and
ordering each of the plurality of decoder layer blocks of different resolution values based on the associated resolution value for each decoder layer block.

6. The method of claim 5, wherein processing, via each of the plurality of decoder layer blocks further comprises each decoder layer block processing layer block outputs from every previous layer block associated with a resolution value preceding the resolution value associated with the respective decoder layer block performing the processing based on the ordering.

7. The method of claim 1, further comprising:
generating, from each of the plurality of decoder layer blocks associated with a highest resolution value, a layer block output defining a decoder output of the neural network model; and
generating a final output from the neural network model using the defined decoder outputs generated by the plurality of decoder layer blocks, each associated with the highest resolution value.

8. The method of claim 7, wherein generating the final output from the neural network model using the defined decoder outputs generated by the plurality of decoder layer blocks, each associated with the highest resolution value comprises one of:
averaging the defined decoder outputs to generate the final output from the neural network model; or alternatively
selecting one of the defined decoder outputs generated by the plurality of decoder layer blocks based on configurable implementation parameters of the neural network model.

9. The method of claim 1, further comprising:
training the neural network model using machine learning training to optimize an objective function; and
wherein the objective function comprises a respective loss term corresponding to layer block outputs from each of the plurality of decoder layer blocks of the executing neural network model.

10. The method of claim 9:
wherein each layer block output from each of the plurality of decoder layer blocks of the executing neural network model is a respective estimate of a segmentation map of an input image processed by the neural network model; and
wherein the respective loss term corresponding to each layer block output from each of the plurality of decoder layer blocks of the executing neural network model comprises a cross-entropy term and a dice coefficient term.

11. The method of claim 10, wherein the method further comprises:
receiving the input image for image segmentation processing at the system via the executing neural network model; and
wherein the input image comprises a medical image.

12. The method of claim 1:
wherein one or more of the plurality of layer blocks include a plurality of convolutional layers;
wherein each of the plurality of convolutional layers is configured to process a layer input comprising the outputs of each previous convolutional layer in the layer block; and
wherein a different one or more of the plurality of layer blocks are residual blocks.

13. A system comprising:
a memory to store instructions;
a processor to execute instructions stored within the memory;
the processor to execute a neural network model stored within the memory of the system;
wherein the neural network model is formed from a plurality of layer blocks including an encoder layer block which precedes a plurality of decoder layer blocks;
the processor to execute an image resolution manager to associate a resolution value with each of the plurality of layer blocks defining a resolution of the layer block input to be processed by the layer block to generate the layer block output;
the processor to execute the encoder layer block to process a respective layer block input including a down-sampled layer block output from a higher resolution layer block associated with a resolution value greater than the resolution value for the encoder layer block;
the processor to execute each of the plurality of decoder layer blocks to process a respective layer block input including both (i) an up-sampled layer block output from a lower resolution layer block associated with a resolution value less than the resolution value for the respective decoder layer block and (ii) a layer block output of a previous layer block associated with a prior resolution value of a layer block which precedes the respective decoder layer block; and the processor to execute a model output manager to generate the respective layer block output from the processing via the encoder layer block and the plurality of decoder layer blocks by summing or concatenating the processed layer block inputs.

14. The system of claim 13, wherein each of the plurality of layer blocks include one or more neural network layers configured to process a respective layer block input and responsively generate a corresponding layer block output.

15. The system of claim 13, further comprising:
the processor to order the plurality of layer blocks of the neural network to position the encoder layer block prior to the plurality of decoder layer blocks;
the processor to order each of the plurality of decoder layer blocks of different resolution values based on the associated resolution value for each decoder layer block; and
wherein the processor to execute each of the plurality of decoder layer blocks to process layer block outputs from every previous layer block associated with a resolution value preceding the resolution value associated with the respective decoder layer block performing the processing based on the ordering.

16. The system of claim 13:
wherein the processor is to generate from each of the plurality of decoder layer blocks associated with a highest resolution value, a layer block output defining a decoder output of the neural network model;
wherein the processor is to generate a final output from the neural network model using the defined decoder outputs generated by the plurality of decoder layer blocks, each associated with the highest resolution value;
wherein the model output manager is to generate the final output based on: (i) the processor averaging the defined decoder outputs to generate the final output from the neural network model or (ii) the processor selecting one of the defined decoder outputs generated by the plurality of decoder layer blocks based on configurable implementation parameters of the neural network model.

17. Non-transitory computer readable storage media having instructions stored thereupon that, when executed by a system having at least a processor and a memory therein, the instructions cause the processor to perform operations including:
executing, via the processor, a neural network model stored within the memory of the system;
wherein the neural network model is formed from a plurality of layer blocks including an encoder layer block which precedes a plurality of decoder layer blocks;
associating a resolution value with each of the plurality of layer blocks defining a resolution of the layer block input to be processed by the layer block to generate the layer block output;
processing, via the encoder layer block, a respective layer block input including a down-sampled layer block output from a higher resolution layer block associated with a resolution value greater than the resolution value for the encoder layer block;

processing, via each of the plurality of decoder layer blocks, a respective layer block input including both (i) an up-sampled layer block output from a lower resolution layer block associated with a resolution value less than the resolution value for the respective decoder layer block and (ii) a layer block output of a previous layer block associated with a prior resolution value of a layer block which precedes the respective decoder layer block; and generating the respective layer block output from the processing via the encoder layer block and the plurality of decoder layer blocks by summing or concatenating the processed layer block inputs.

18. The non-transitory computer readable storage media of claim 17, wherein the instructions cause the system to perform operations further comprising:
outputting feature-maps from the processing via the encoder layer block; and
receiving the output feature-maps from the encoder layer block for processing via the plurality of decoder layer blocks via skip pathways between nodes within the neural network model.

19. The non-transitory computer readable storage media of claim 17, wherein the instructions cause the system to perform operations further comprising:
ordering the plurality of layer blocks of the neural network to position the encoder layer block prior to the plurality of decoder layer blocks;
ordering each of the plurality of decoder layer blocks of different resolution values based on the associated resolution value for each decoder layer block; and
wherein processing, via each of the plurality of decoder layer blocks further comprises each decoder layer block processing layer block outputs from every previous layer block associated with a resolution value preceding the resolution value associated with the respective decoder layer block performing the processing based on the ordering.

20. The non-transitory computer readable storage media of claim 17, wherein the instructions cause the system to perform operations further comprising:
generating, from each of the plurality of decoder layer blocks associated with a highest resolution value, a layer block output defining a decoder output of the neural network model;
generating a final output from the neural network model using the defined decoder outputs generated by the plurality of decoder layer blocks, each associated with the highest resolution value; and
wherein generating the final output from the neural network model using the defined decoder outputs generated by the plurality of decoder layer blocks, each associated with the highest resolution value comprises one of: (i) averaging the defined decoder outputs to generate the final output from the neural network model or alternatively (ii) selecting one of the defined decoder outputs generated by the plurality of decoder layer blocks based on configurable implementation parameters of the neural network model.

* * * * *